United States Patent
Kremin et al.

(10) Patent No.: US 9,218,073 B1
(45) Date of Patent: Dec. 22, 2015

(54) DETERMINING FORCES OF CONTACTS BETWEEN STYLUSES AND OBJECTS

(71) Applicant: Cypress Semiconductor Corporation, San Jose, CA (US)

(72) Inventors: Viktor Kremin, Lviv (UA); Andriy Ryshtun, Lviv (UA); David G. Wright, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/095,930

(22) Filed: Dec. 3, 2013

Related U.S. Application Data

(63) Continuation of application No. 13/431,425, filed on Mar. 27, 2012.

(60) Provisional application No. 61/512,324, filed on Jul. 27, 2011.

(51) Int. Cl.
*G06F 3/0354* (2013.01)
*G06F 3/044* (2006.01)

(52) U.S. Cl.
CPC ............ *G06F 3/03545* (2013.01); *G06F 3/044* (2013.01)

(58) Field of Classification Search
CPC ...... G06F 3/03545; G06F 3/041; G06F 3/044
USPC ...................... 345/173–179; 178/18.01–20.04
See application file for complete search history.

(56) References Cited

U.S. PATENT DOCUMENTS

| 4,227,044 | A | * | 10/1980 | Fencl | 178/19.03 |
|---|---|---|---|---|---|
| 4,672,154 | A | | 6/1987 | Rodgers et al. | |
| 5,402,151 | A | | 3/1995 | Duwaer | |
| 5,410,334 | A | * | 4/1995 | Comerford | 345/179 |
| 5,414,227 | A | * | 5/1995 | Schubert et al. | 345/179 |
| 5,528,002 | A | | 6/1996 | Katabami | |
| 5,693,914 | A | * | 12/1997 | Ogawa | 178/18.07 |
| 5,705,741 | A | | 1/1998 | Eaton et al. | |
| 6,441,810 | B1 | | 8/2002 | Skoog et al. | |
| RE39,881 | E | | 10/2007 | Flowers | |
| 7,288,946 | B2 | | 10/2007 | Hargreaves et al. | |
| 7,292,229 | B2 | * | 11/2007 | Morag et al. | 345/173 |
| 7,337,085 | B2 | | 2/2008 | Soss | |
| 7,825,913 | B2 | | 11/2010 | Solomon et al. | |
| 8,243,049 | B2 | | 8/2012 | Vos | |
| 8,493,359 | B2 | | 7/2013 | Wright et al. | |
| 8,564,553 | B2 | * | 10/2013 | Yeh et al. | 345/173 |

(Continued)

OTHER PUBLICATIONS

USPTO Non-Final Rejection for U.S. Appl. No. 13/431,425 dated Nov. 8, 2013; 18 pages.

(Continued)

*Primary Examiner* — Dwayne Bost
*Assistant Examiner* — Darlene M Ritchie

(57) ABSTRACT

An apparatus comprising a stylus with a dynamically switch tip shield is provided. The apparatus includes an elongated stylus housing having an end, a conductive tip disposed at least partially inside the stylus housing and extending from the end, a force sensor coupled to the conductive tip and configured to detect contact between the conductive tip and an object, a tip shield coupled with the stylus housing and extending from the end, and a switch coupled to the tip shield and the conductive tip. The force sensor may be an inductive sensor, a capacitive sensor, a piezo sensor, a force sensing resistor sensor, or an optical sensor.

19 Claims, 16 Drawing Sheets

(56) References Cited

U.S. PATENT DOCUMENTS

| | | | |
|---|---|---|---|
| 8,648,837 B1* | 2/2014 | Tran et al. | 345/179 |
| 8,659,580 B2* | 2/2014 | Mao et al. | 345/179 |
| 2003/0214490 A1 | 11/2003 | Cool | |
| 2003/0223803 A1 | 12/2003 | Schrijver | |
| 2004/0144575 A1* | 7/2004 | Zloter et al. | 178/19.02 |
| 2008/0106520 A1 | 5/2008 | Free et al. | |
| 2008/0128180 A1 | 6/2008 | Perski et al. | |
| 2008/0156546 A1* | 7/2008 | Hauck | 178/19.01 |
| 2008/0166048 A1* | 7/2008 | Raif et al. | 382/187 |
| 2008/0192028 A1 | 8/2008 | Burstrom et al. | |
| 2010/0051356 A1* | 3/2010 | Stern et al. | 178/19.04 |
| 2010/0085325 A1 | 4/2010 | King-Smith et al. | |
| 2010/0155153 A1* | 6/2010 | Zachut | 178/18.03 |
| 2010/0170726 A1 | 7/2010 | Yeh et al. | |
| 2010/0188362 A1* | 7/2010 | Mahowald et al. | 345/174 |
| 2010/0283766 A1* | 11/2010 | Shieh | 345/179 |
| 2011/0016956 A1 | 1/2011 | Igasaki et al. | |
| 2011/0155479 A1* | 6/2011 | Oda et al. | 178/18.06 |
| 2011/0304577 A1* | 12/2011 | Brown et al. | 345/174 |
| 2012/0050207 A1 | 3/2012 | Westhues et al. | |
| 2012/0050231 A1* | 3/2012 | Westhues et al. | 345/179 |
| 2012/0127110 A1 | 5/2012 | Amm et al. | |
| 2012/0327040 A1 | 12/2012 | Simon et al. | |
| 2013/0050154 A1* | 2/2013 | Guy et al. | 345/179 |
| 2013/0234986 A1 | 9/2013 | Elias | |
| 2013/0265265 A1* | 10/2013 | Stern | 345/173 |
| 2013/0265281 A1* | 10/2013 | Zachut | 345/174 |
| 2014/0002422 A1* | 1/2014 | Stern et al. | 345/179 |

OTHER PUBLICATIONS

Rosenmaum, K.A., "A Low-Cost Force Sensor for Electromechanical Actuation Systems", IEEE Xplore Digital Library, Vehicle Power and Propulsion Conference, 2007. VPPC 2007. IEEE, Sep. 9-12, 2007, 242-249pp.

USPTO Notice of Allowance for U.S. Appl. No. 13/431,425 dated May 9, 2014; 13 pages.

USPTO Notice of Allowance for U.S. Appl. No. 13/431,425 dated Jun. 30, 2014; 10 pages.

* cited by examiner

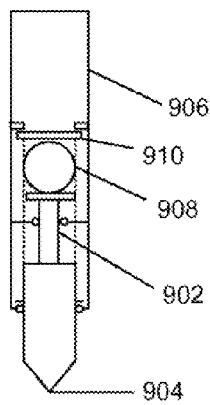
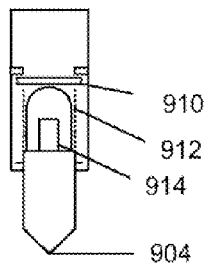
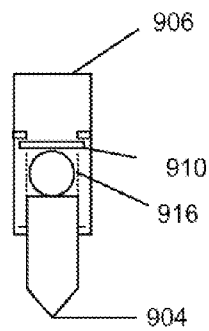
FIG. 9a     FIG. 9b     FIG. 9c
FIG. 9d
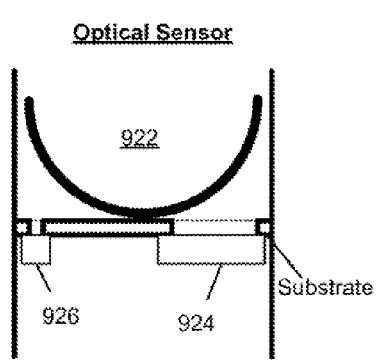
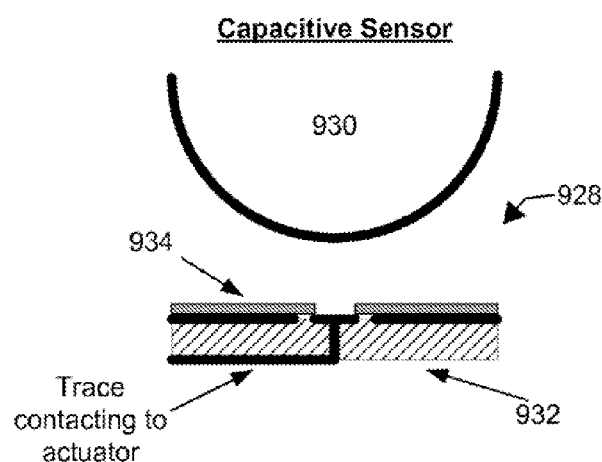
FIG. 9e     FIG. 9f

DETERMINING FORCES OF CONTACTS BETWEEN STYLUSES AND OBJECTS

RELATED APPLICATIONS

This application is a continuation of U.S. patent application Ser. No. 13/431,425, filed Mar. 27, 2012, which claims the benefit of U.S. Provisional No. 61/512,324, filed Jul. 27, 2011, the entire contents of which are incorporated by reference herein in their entirety.

TECHNICAL FIELD

This disclosure relates to the field of user interface devices and, in particular, to capacitive sensor devices.

BACKGROUND

The use of a stylus with a touch screen interface is well established. Touch screen designs have incorporated many different technologies including resistive, capacitive, inductive, and radio frequency sensing arrays. Resistive touch screens, for example, are passive devices well suited for use with a passive stylus. The original PalmPilots® devices from the mid-1990s were one of the first successful commercial devices to utilize a resistive touch screen designed for use with a stylus and helped to popularize that technology. Although resistive touch screens can sense the input from nearly any object, multi-touch is generally not supported. An example of a multi-touch application may be applying two or more fingers to the touch screen. Another example may be inputting a signature, which may include simultaneous palm and stylus input signals. Due to these and other numerous disadvantages, capacitive touch screens are increasingly replacing resistive touch screens in the consumer marketplace.

Various capacitive stylus approaches have been implemented for use with touch screens and are found in many consumer applications such as point-of-sale terminals (e.g., the signature pad used for credit card transactions in retail stores) and other public uses. However, any type of capacitive stylus can be affected by the shadow effect which occurs to some degree at any non-perpendicular angle between the stylus and sensing area.

BRIEF DESCRIPTION OF THE DRAWINGS

The present invention is illustrated by way of example, and not of limitation, in the figures of the accompanying drawings in which:

FIG. 9a depicts is a block diagram illustrating one embodiment of a plunger coupled with the stylus tip.

FIG. 9b is a block diagram illustrating another embodiment of a force sensor utilizing a deformable actuator.

FIG. 9c is a block diagram illustrating one embodiment of a deformable actuator directly in contact with both the stylus tip and sensor substrate.

FIG. 9d is a block diagram illustrating the operation of a deformable partially conductive actuator.

FIG. 9e is a block diagram illustrating one embodiment of an optical substrate sensor for use with the deformable actuator.

FIG. 9f is a block diagram illustrating one embodiment of a capacitive substrate sensor for use with the deformable actuator.

DETAILED DESCRIPTION

Apparatuses and methods of determining an amount of force exerted on a tip of a stylus are described. The apparatus, in one embodiment, includes a force sensor coupled to the conductive tip and configured to detect contact between the conductive tip and an object. The force sensor may include one or more of an inductive sensor, a capacitive sensor, a piezo sensor, a force sensing resistor sensor, and an optical sensor.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
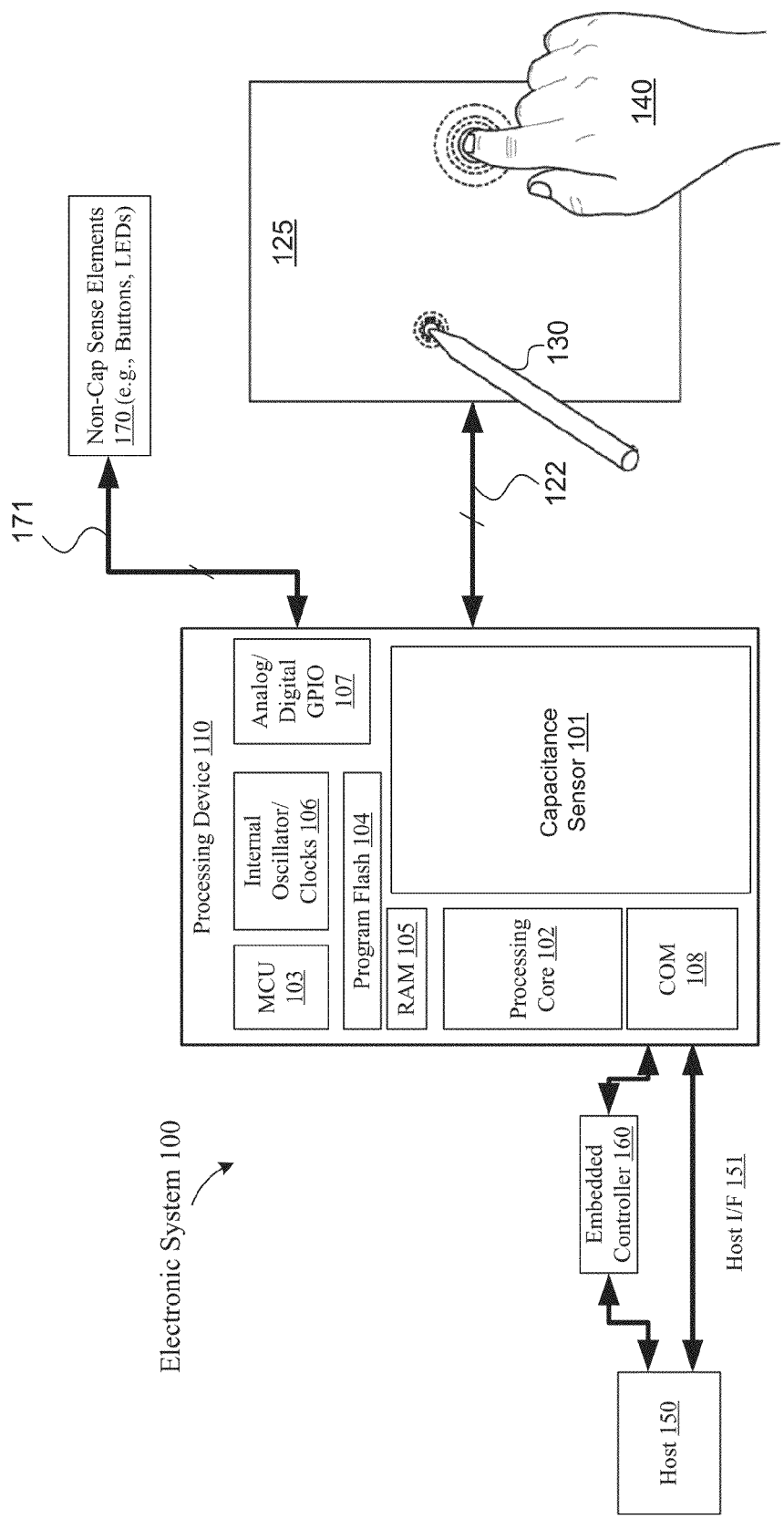
FIG. 1 is a block diagram illustrating one embodiment of an electronic system having a processing device for detecting a presence of a touch object and a stylus.

FIG. 1 is a block diagram illustrating one embodiment of an electronic system 100 having a processing device 110 for detecting a presence of a touch object 140 and a stylus 130. The electronic system 100 includes the processing device 110, a capacitive sense array 125, a stylus 130, a host processor 150, an embedded controller 160, and non-capacitive sense elements 170. In the depicted embodiment, the electronic system 100 includes the capacitive sense array 125 coupled to the processing device 110 via a bus 122. The capacitive sense array 125 may include a multi-dimension capacitive sense array. The multi-dimension sense array includes multiple sense elements, organized as rows and columns. In another embodiment, the capacitive sense array 125 operates as an all-points-addressable ("APA") mutual capacitive sense array. In another embodiment, the capacitive sense array 125 operates as a coupled-charge receiver. Alternatively, other configurations of capacitive sense arrays may be used. In one embodiment, the capacitive sense array 125 may be included in an ITO panel or a touch screen panel.

The processing device 110 may detect and track the active stylus 130 and the touch object 140 individually on the capacitive sense array 125. In one embodiment, the processing device 110 can detect and track both the active stylus 130 and the touch object 140 concurrently on the capacitive sense array 125. In one embodiment, the active stylus 130 is configured to operate as the timing "master," and the processing device 110 adjusts the timing of the capacitive sensor 101 to match that of the active stylus 130 when the active stylus 130 is in use.

In one embodiment, the capacitive sense array 125 capacitively couples with the active stylus 130, as opposed to conventional inductive stylus applications. It should also be noted that the same assembly used for the capacitive sense array 125, which is configured to detect touch objects 140, is also used to detect and track the active stylus 130 without an additional PCB layer for inductively tracking the active stylus 130 as done conventionally.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configured to implement a variety of digital logic circuits (e.g., DACs, digital filters, or digital control systems) using, in one embodiment, configurable user modules ("UMs").

The digital block array may be coupled to a system bus. The processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by the processing core 102 to implement operations described herein). The processing device 110 may also include a memory controller unit ("MCU") 103 coupled to memory and the processing core 102.

The processing device 110 may also include an analog block array (not shown). The analog block array is also coupled to the system bus. The analog block array also may be configured to implement a variety of analog circuits (e.g., ADCs or analog filters) using, in one embodiment, configurable UMs. The analog block array may also be coupled to the GPIO 107.

As illustrated, the capacitance sensor 101 may be integrated into the processing device 110. The capacitance sensor 101 may include analog I/O for coupling to an external component, such as a touch-sensor pad (not shown), a capacitive sense array 125, a touch-sensor slider (not shown), touch-sensor buttons (not shown), and/or other devices.

The capacitance sensor 101 may be configured to measure capacitance using mutual capacitance sensing techniques, self-capacitance sensing technique, charge coupling techniques or the like. In one embodiment, the capacitance sensor 101 operates using a charge accumulation circuit, a capacitance modulation circuit, or other capacitance sensing methods known by those of skill in the art.

In an embodiment, the capacitance sensor 101 is of the Cypress TMA-4xx family of touch screen controllers. Alternatively, other capacitance sensors may be used. The mutual capacitive sense arrays, or touch screens, as described herein, may include a transparent, conductive sense array disposed on, in, or under either a visual display itself (e.g. LCD monitor), or a transparent substrate in front of the display.

Figure 2:
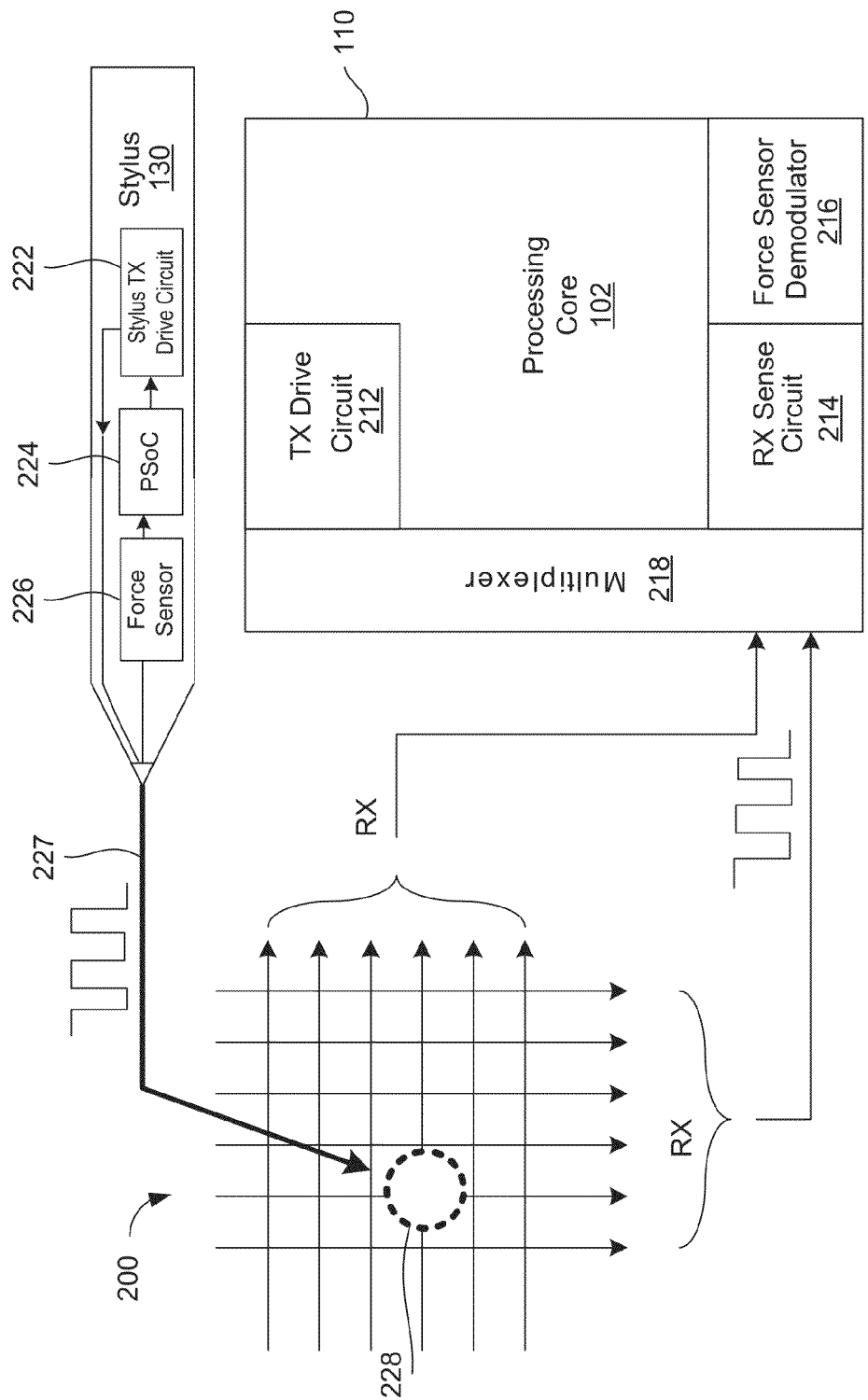
FIG. 2 is a block diagram illustrating one embodiment of a system including a capacitive sense array, a stylus, and a processing device that converts measured capacitances to touch coordinates.

In an embodiment, the TX and RX electrodes are configured in rows and columns, respectively (see FIG. 2). It should be noted that the rows and columns of electrodes can be configured as TX or RX electrodes by the capacitance sensor 101 in any chosen combination. In one embodiment, the TX and RX electrodes of the sense array 200 of FIG. 2 are configured to operate as a TX and RX electrodes of a mutual capacitive sense array in a first mode to detect touch objects, and to operate as electrodes of a coupled-charge receiver in a second mode to detect a stylus 130 on the same electrodes of the sense array.

The stylus 130, which generates a stylus TX signal when activated, is used to couple charge to the capacitive sense array, instead of measuring a mutual capacitance at an intersection of a RX electrode and a TX electrode (a sense element) as done during mutual capacitance sensing. The capacitance sensor 101, in one embodiment, does not use mutual capacitance or self-capacitance sensing to measure capacitances of the sense elements when performing a stylus scan. Rather, the capacitance sensor 101 may measure a charge that is capacitively coupled between the sense array 200 and the stylus as described herein.

The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in capacitance affecting some of the electrodes.

In another embodiment, the presence of the finger increases the coupling capacitance between the two electrodes. Thus, the location of the finger on the capacitive sense array 125 can be determined by identifying both the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined.

It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of centroid algorithms may be used to detect the center of the touch as would be appreciated by one of ordinary skill in the art having the benefit of this disclosure.

In one embodiment, the electronic system 100 includes a touch sensor pad coupled to the processing device 110 via a bus. Touch sensor pad may include a multi-dimension capacitive sense array. The multi-dimension sense array includes multiple sense elements, organized as rows and columns. In another embodiment, the touch sensor pad is an APA mutual capacitive sense array. In another embodiment, the touch sensor pad operates as a coupled-charge receiver.

In an embodiment, the electronic system 100 may also include non-capacitive sense elements 170 coupled to the processing device 110 via bus 171 and GPIO port 107. The non-capacitive sense elements 170 may include buttons, light emitting diodes ("LEDs"), and other user interface devices, such as a mouse, a keyboard, or other functional keys that do not use capacitance sensing. In one embodiment, buses 121, 122, and 171 are embodied in a single bus. Alternatively, these buses may be configured into any combination of one or more separate buses.

The processing device 110 may include internal oscillator/clocks 106 and a communication block ("COM") 108. In another embodiment, the processing device 110 includes a spread spectrum clock (not shown). The oscillator/clocks block 106 provides clock signals to one or more of the components of the processing device 110.

The communication block 108 may be used to communicate with an external component, such as a host processor 150, via host interface ("I/F") line 151. Alternatively, the processing device 110 may also be coupled to embedded controller 160 to communicate with the external components, such as host processor 150. In one embodiment, the processing device 110 is configured to communicate with the embedded controller 160 or the host processor 150 to send and/or receive data.

The processing device 110 may reside on a common carrier substrate such as, for example, an integrated circuit ("IC") die substrate, a multi-chip module substrate, or the like. Alternatively, the components of the processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host 150.

The capacitance sensor 101 may be integrated into the IC of the processing device 110, or alternatively, in a separate IC. Alternatively, descriptions of the capacitance sensor 101 may be generated and compiled for incorporation into other integrated circuits. For example, behavioral level code describing the capacitance sensor 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe the capacitance sensor 101.

It should be noted that the components of the electronic system 100 may include all the components described above. Alternatively, the electronic system 100 may include some of the components described above.

In one embodiment, the electronic system 100 is used in a tablet computer. Alternatively, the electronic system 100 may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, and eBook reader, global position system ("GPS") or a control panel.

The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

FIG. 2 is a block diagram illustrating one embodiment of a system including a capacitive sense array, a stylus, and a processing device that converts measured capacitances to touch coordinates. The processing device 110 includes a processing core 102, a TX driver circuit 212, a RX sense circuit 214, a multiplexer 218, and a force sensor demodulator 216. In an embodiment, the processing core 102 is similar to the capacitance sensor 101 described above. The sense array 200 includes multiple lines that can be configured as TX lines or RX lines. For example, in one mode, the TX drive circuit 212 drives a TX signal on a first set of TX lines, and the RX sense circuit 214 measures signals on a second set of RX lines. In another mode, the TX lines are RX lines and the RX sense circuit 214 is configured to measure signals on two sets of RX lines (as illustrated in FIG. 2). These sets of RX lines can be considered as separate receive channels for stylus signal sensing. It should be noted that TX and RX lines are also referred to as TX and RX electrodes. The multiplexer 218 can be used to connect the TX lines or the RX lines to the TX drive circuit 212 or the RX sense circuit 214 based on whether the lines are being used as RX lines or TX lines.

In one embodiment, during normal finger scanning, a passive object (e.g., a finger or other conductive object) touches the sense array 200 at contact point (not illustrated in FIG. 2). The TX drive circuit 212 drives the TX lines with a TX signal. The RX sense circuit 214 measures the RX signals on RX lines. In an embodiment, the processing core 102 determines the location of contact point based on the mapping techniques as would be appreciated by one of ordinary skill in the art having the benefit of this disclosure.

Alternatively, other techniques may be used to determine the contact point. The TX lines and RX lines are multiplexed by multiplexor 330. The processing core 102 provides the TX signal on the TX lines (rows) and measures the capacitance coupling on the RX lines (columns). In an embodiment, the TX and RX lines are orthogonal and may be used interchangeably (e.g., transmitting on columns and receiving on rows). In an embodiment, the TX drive circuit 212 transmits the TX signal through a high impedance ITO panel (TX lines), thus limiting the upper frequency limit and speed of the system. The total scan time may also dependent upon the number of TX lines and RX lines in the sense array 200. For example, the TX drive circuit 212 provides a TX signal on a TX line and simultaneously reads the capacitively coupled RX signal on a RX line, according to one embodiment. In another embodiment, the RX lines are multiplexed in two or more scans.

In one embodiment, during stylus scanning, the stylus TX drive circuit 222 of stylus 130 provides a TX signal 227 directly to contact point 228 on the sense array 200, thus eliminating the need to dedicate the second set of RX lines (previously TX in finger scanning) to transmitting a TX signal from the TX drive circuit 212. As such, the RX sense circuit 214 measures the RX signal on both the first set of RX lines (rows) and a second set of RX lines (columns) of sense array 200. This may result in faster position tracking because the TX signal no longer passes through the high impedance ITO lines, thus reducing the scan time to the total RX measurement. The active stylus 130 includes the stylus TX drive circuit 222, a microcontroller (MCU) 224, and a force sensor 226. In one embodiment, the processing core 102 performs a normal scan of the sense array 200 during RX sensing of TX signal from the TX drive circuit 212 (described above), and a stylus scan of the sense array 200 during RX sensing of the stylus TX signal 227.

The stylus 130 includes the stylus TX drive circuit 222 (also referred to as a tip driver), and an MCU 224. The host 150 of FIG. 1 generates a TX signal and transmits the TX signal to the stylus 130. The signal can be transmitted by radio, inductively, optically, or other methods of communication. A receiver (not shown) receives the TX signal via an antenna and the receiver can send the TX signal to the MCU 224 to be transmitted by the stylus tip via the stylus TX drive circuit 222. Alternatively, other frequency and other communication mediums may be used as would be appreciated by one of ordinary skill in the art having the benefit of this disclosure. Furthermore, the stylus may be the timing master as discussed above in conjunction with FIG. 1.

In an embodiment, the stylus 130 is powered by battery voltage. The battery voltage may be provided by battery cells (e.g., 1.5V AAA cells). A booster (not illustrated) may boost the battery voltage delivered to a tip driver (e.g., a stylus TX driver circuit 222), allowing the tip driver to amplify the TX signal to a higher voltage (e.g., 10V-20V). A high voltage stylus TX signal may enable the host 150 to detect the stylus 130 when it is "hovering," or in close proximity to the sense array 200, but not physically touching an overlay disposed over the sense array. A high voltage stylus TX signal may also provide for faster and more robust detection by the host 150.

For the stylus scan, the processing core 102 measures a charge being capacitively coupled to the row and column electrodes of the sense array from the stylus. To further illustrate, a mutual capacitance scan uses both a TX and RX signal to track an object. As described above, this is typically done by scanning the RX lines for the driven TX line in a successive fashion by the processing core 102. In an array of N rows (TX signal) and M columns (RX signal), a complete scan would perform N×M total scans if one RX line is sensed at a time. For example, transmitting a TX signal ("TX'ing") on row 1, and receiving a receive signal ("RX'ing") on columns 1-M, followed by TX'ing on row 2 and RX'ing on columns 1-M, and so on in sequential fashion. Alternatively, more RX lines can be sensed at a time. In one embodiment, 4 or 8 RX lines are sensed at a time, but in other embodiments, all RX lines may be sense simultaneously or sequentially.

With multiple RX channels to sense more than one RX line at the same time, the complete scan would be (N*M)/(# RX channels). In contrast, a stylus scan may not use a TX signal by the TX drive circuit 212 and a complete scan would perform a single RX signal measurement on each row and column, or N+M scans, thus resulting in a significantly reduced stylus scanning time for the entire sense array as compared with mutual capacitance scanning time for the entire sense array. Like above, multiple RX channels can be used to sense multiple RX lines at the same time. In this case, the complete scan would be (N+M)/(# RX channels).

In the depicted embodiment, the TX driver circuit 212 generates a stylus TX signal 227 from the tip of the active stylus 130 into the touch screen. The processing core 102 senses this signal and resolves this to be the point of the active stylus 130. The TX signal 227 of the stylus may, in one embodiment, be synchronized to the host. Synchronization between the processing core 102 sensing and the signal generated by the active stylus 130 is used in some active stylus configurations. In the un-tethered active stylus, this synchronization is done wirelessly. The host side (e.g., tablet side) antenna transmits a synchronization signal that is received by an antenna inside the active stylus 130. In one embodiment, the un-tethered active stylus solution uses magnetic coupling between the host and the stylus for signal transmitting. In this embodiment, the antenna design provides a uniform magnetic field across the display surface. In another embodiment, the stylus may be the timing master as discussed above in conjunction with FIG. 1.

As described above, a passive stylus may be used as a touch object to interface with the various touch screens described above. In contrast to passive styluses, an active stylus 130 provides the transmit signal 227 (TX signal). This signal 227 may be provided to the active stylus 130 by the processing core 102 as part of the synchronization. The active stylus 130 capacitively couples the stylus TX signal 227 to the sense array 200.

In an embodiment, the stylus signal amplitude, frequency, phase, etc., may be the same or similar to that which is utilized for finger sensing by the processing core 102. Alternatively, the stylus TX signal may be different than the TX signal from the TX drive circuit 212, in amplitude, frequency, and phase. In another embodiment, the stylus TX signal may have a different code for code modulation than a code used in the TX signal from the TX drive circuit 212. In an exemplary embodiment, the stylus TX signal 227 has greater amplitude than the finger sensing TX signal from the TX drive circuit 212. For example, in one exemplary embodiment, the stylus TX signal 227 ranges from approximately 20-50V, as compared with the approximately 5-10V typically provided by the processing core 102. Alternatively, other voltages may be used as would be appreciated by one of ordinary skill in the art. The higher stylus TX voltage couples more charge to the sense array 200 more quickly, thus reducing the amount of time used to sense each row and column of the sense array 200. Other embodiments may incorporate higher voltages on the sense array TX lines to obtain similar time efficiency improvements for finger sensing.

In an embodiment, the active stylus 130 applies a higher frequency on the stylus TX signal 227 than the TX signal frequency from TX drive circuit 212 to achieve a reduced sensing time. Charge may be capacitively coupled from the active stylus 130 to the sense array 200 during the rising and falling edges of the stylus TX signal 227. Thus, a higher TX frequency provides a greater number of rising and falling edges over a given period of time, resulting in greater charge coupling.

The practical upper limit of the TX frequency in finger sensing mode (e.g., TX signal on sense array 200 for finger sensing) is dependent upon the resistor-capacitor ("RC") time constant of the panel's individual sense elements and interconnect (not shown). This is typically due to high impedance materials (e.g. ITO) used in the fabrication of the sense array 200.

A high-impedance sense array (e.g., sense array 200) may result in a high time constant and resulting signal attenuation of the rows (TX lines) and columns (RX lines) of sense elements, which may limit the maximum sensing frequency. When using an active stylus to transmit the stylus TX signal 227 directly to a contact point 228 on sense array 200, the stylus TX signal 227 does not pass through the high impedance path, and therefore the maximum operating frequency for the stylus TX signal 227 can be increased. For example, the time constant of the RX traces (both rows and columns) may be used to determine an upper frequency limit, but this will typically be at least double the upper frequency limit used in finger sensing. Typically the impedance is half of the impedance as compared with the impedance when performing mutual capacitance scanning, since the row's impedance is eliminated and the column's impedance remains (or vice versa). It should be noted that both finger sensing and stylus sensing use frequency selection where the operation period should be smaller than the panel's time constant; so, restrictions for the operation frequency selection are approximately the same for finger and stylus sensing.

Although the RX lines (electrodes) appear as lines in FIG. 2, these lines may represent bars or elongated rectangles or other tessellated shapes such as diamonds, rhomboids, and chevrons. Alternatively, other useable shapes may be used as would be appreciated by one of ordinary skill in the art having the benefit of this disclosure.

Figure 3A:
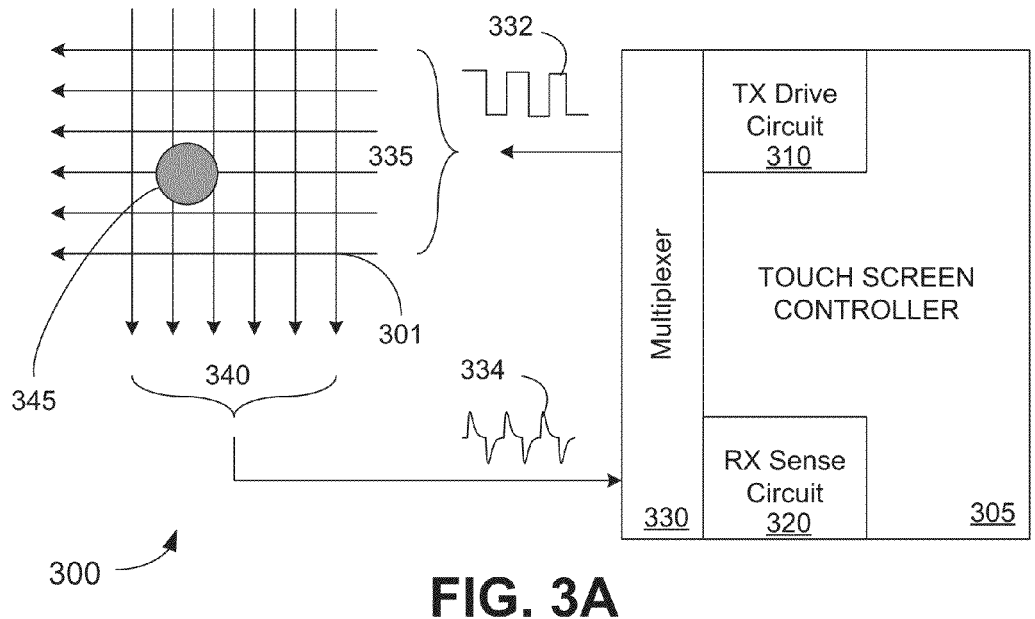
FIG. 3A is a block diagram illustrating one embodiment of a system including the sense array and a touch screen controller that converts measured capacitances to touch coordinates.

FIG. 3A is a block diagram illustrating one embodiment of a system 300 including the sense array 301 and a touch screen controller 305 that converts measured capacitances to touch coordinates. In an embodiment, the touch screen controller 305 is similar to the capacitance sensor 301 described above. In another embodiment, the touch screen controller 305 is the processing device. The sense array 301 includes TX lines 335 and RX lines 340. The touch screen controller 305 includes a TX drive circuit 310, an RX sense circuit 320, and a multiplexor 330.

In an embodiment, a passive object (e.g., a finger or other conductive object) touches the sense array 301 at contact point 345. The TX drive circuit 310 drives the TX lines 335 with TX signal 332. The RX sense circuit 320 measures the RX signal 334 on RX lines 340 and 360. In an embodiment, the touch screen controller 305 determines the location of contact point 345 based on the mapping techniques described above in conjunction with FIGS. 1-2. The TX lines 335 and RX lines 340 are multiplexed by multiplexor 330. The touch screen controller 305 provides the TX signal 332 on the TX lines 335 (rows) and measures the capacitance coupling on the RX lines 340 (columns).

In an embodiment, the TX and RX lines 335, 340 are orthogonal and may be used interchangeably (e.g., transmitting on columns and receiving on rows). In an embodiment, the TX drive circuit 310 transmits the TX signal 332 through a high impedance ITO panel (TX lines 335), thus limiting the upper frequency limit and speed of the system. The total scan time may also be dependent upon the number of TX lines 335 and RX lines 340 in the sense array 301. For example, the TX drive circuit 310 provides a TX signal 332 on each TX line 335 and simultaneously reads the capacitively coupled RX signal 334 on each RX line 340 and 360, according to one embodiment. In another embodiment, the RX lines 340 are multiplexed in two or more scans, as described in conjunction with FIG. 5B.

Figure 3B:
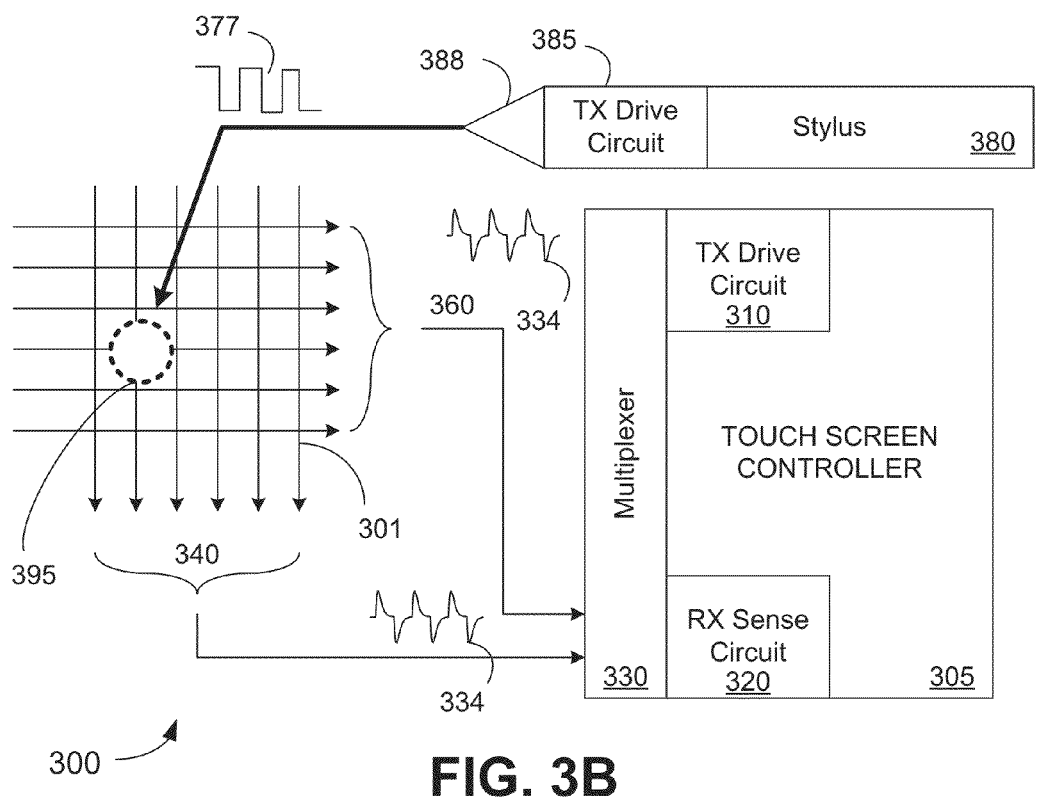
FIG. 3B is a block diagram illustrating one embodiment of a system including the sense array, a stylus, and the touch screen controller that converts measured capacitances to touch coordinates

FIG. 3B is a block diagram illustrating one embodiment of a system 300 including the sense array 301, a stylus 380, and the touch screen controller 305 that converts measured capacitances to touch coordinates. The sense array 301 includes RX lines 340 and 360. The RX lines 360 are the same as TX lines 335 in FIG. 3A, but used as a receive channel in system 300 as further described below for stylus signal sensing. The touch screen controller 305 includes the TX drive circuit 310, the RX sense circuit 320, and the multiplexor 330. The stylus 380 includes a TX drive circuit 385 and a stylus tip 388.

In an embodiment, the stylus TX drive circuit 385 of stylus 380 provides a TX signal 377 directly to contact point 395 on sense array 301, thus eliminating the need to dedicate the RX 360 lines (previously TX 335 in FIG. 3A) to transmitting a TX signal from the TX drive circuit 310. As such, the RX sense circuit 320 measures the RX signal 334 on both the rows (RX lines 360) and columns (RX lines 340) of sense array. This results in faster position tracking because the TX signal no longer passes through the high impedance ITO lines, thus reducing the scan time to the total RX measurement. In one embodiment, the touch screen controller 305 performs a normal scan of the sense array 301 during RX sensing of TX signal from the TX drive circuit 310 (illustrated in FIG. 3A), and a stylus scan of the sense array 301 during RX sensing of the stylus TX signal 377.

For the stylus scan, the touch screen controller 305 measures a charge being capacitively coupled to the row and column electrodes of the sense array from the stylus. To further illustrate, a mutual capacitance scan uses both a TX and RX signal 332, 334 to track an object. As described above, this is typically done by scanning the RX lines 340 for each driven TX line 335 in a successive fashion by the touch screen controller 305. In an array of N rows (TX signal) and M columns (RX signal), a complete scan would require N×M total scans if one RX line is sensed at a time. For example, transmitting a TX signal ("TX'ing") on row 1, and receiving a receive signal ("RX'ing") on columns 1-M, followed by TX'ing on row 2 and RX'ing on columns 1-M, and so on in sequential fashion.

Alternatively, more RX lines can be sensed at a time. In one embodiment, 4 or 8 RX lines are sensed at a time, but in other embodiments, all RX lines may be sense simultaneously or sequentially. With multiple RX channels to sense more than one RX line at the same time, the complete scan would be (N*M)/(# RX channels). In contrast, a stylus scan does not require a TX signal by the TX drive circuit 310 and a complete scan would only require a single RX signal measurement on each row and column, or N+M scans, thus resulting in a significantly reduced stylus scanning time for the entire sense array as compared with mutual capacitance scanning time for the entire sense array. Like above, multiple RX channels can be used to sense multiple RX lines at the same time. In this case, the complete scan would be (N+M)/(# RX channels).

It should be noted that the embodiments described herein may use the same electrodes (e.g., ITO panel lines), which served the TX function for the touch scanning may be used for the RX function for the stylus sensing. It should also be noted that both stylus and finger sensing operate at the frequencies which are not attenuated largely by the sensing device (e.g., ITO panel).

As described above, a passive stylus may be used as a touch object to interface with the various touch screens described above. In contrast to passive styluses, an active stylus described herein provides the transmit ("TX") signal that is typically provided by the touch screen controller 305 in finger sensing modes.

The stylus 380 capacitively couples the stylus TX signal 377 to the sense array 301. In an embodiment, the stylus signal amplitude, frequency, phase, etc., may be the same or similar to that which is utilized for finger sensing by the touch screen controller 305. Alternatively, the stylus TX signal may be different than the TX signal from the TX drive circuit 310, in amplitude, frequency, and phase. In another embodiment, the stylus TX signal may have a different code for code modulation than a code used in the TX signal from the TX drive circuit 310. In an exemplary embodiment, the stylus TX signal 377 has a greater amplitude than the finger sensing TX signal 332 from the TX drive circuit 310. For example, in one exemplary embodiment, the stylus TX signal 377 ranges from approximately 20-50V, as compared with the approximately 5-10V typically provided by the touch screen controller 305.

Alternatively, other voltages may be used as would be appreciated by one of ordinary skill in the art. The higher stylus TX voltage couples more charge to the MC array 301 more quickly, thus reducing the amount of time required to sense each row and column of the sense array 301. Other embodiments may incorporate higher voltages on the MC array TX line 335 to obtain similar time efficiency improvements for finger sensing.

In an embodiment, the frequency of the stylus TX signal 377 is different than the frequency of the finger sensing TX signal 332. By using different TX frequencies, the touch screen controller 305 can differentiate between stylus TX signals and finger sensing TX signals. Alternatively, the touch screen controller 305 can differentiate the stylus TX signals from the TX drive circuit 310 TX signals 332 using other techniques as would be appreciated by those of ordinary skill in the art with the benefit of this disclosure, such as detecting the difference in signal characteristics (e.g., phase, frequency, amplitude, and code modulation).

Various embodiments described herein are applicable to any mutual capacitance touch screen system using an untethered, or wireless active stylus configured to be capacitively coupled to the mutual capacitance array, where the active stylus receives synchronization or timing data from the touch screen controller. For example, the stylus can generate the stylus TX signals according to the synchronization or timing data received from the touch screen controller.

Figure 4A:
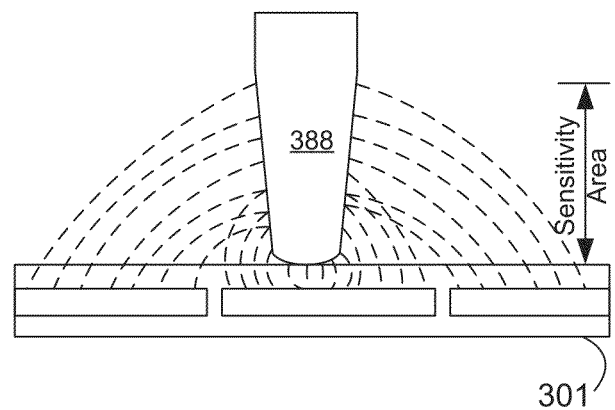
FIG. 4a is cross-sectional diagram illustrating an embodiment of the stylus tip.
Figure 4B:
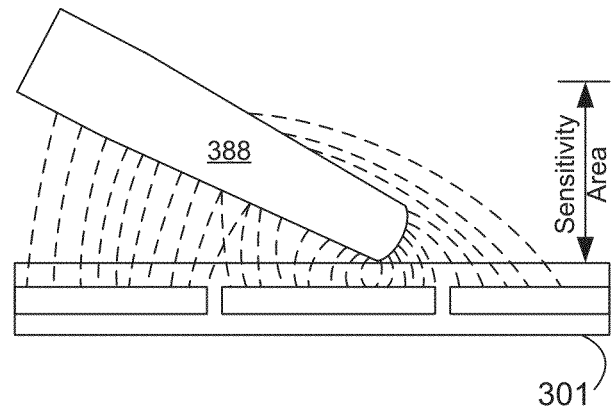
FIG. 4b is cross-sectional diagram illustrating another embodiment of the stylus tip.

FIGS. 4a and 4b are cross-sectional diagrams illustrating embodiments of the stylus tip 388. The stylus tip 388 interacts with the sensor array 301 to create an electric field depicted here by dashed lines. When the stylus tip 388 is in a substantially perpendicular orientation with regard to the sensor array 301, the electric field is substantially symmetric, as depicted. However, a user typically holds the stylus at an angle with respect to touchpad screen surface. The angle of the stylus, and subsequently stylus tip, results in a substantially irregular electric field also referred to as the shadow effect. This irregular electric field causes the processing device 110 to incorrectly identify the position of the stylus with reference to the sensor array 301.

Figure 5:
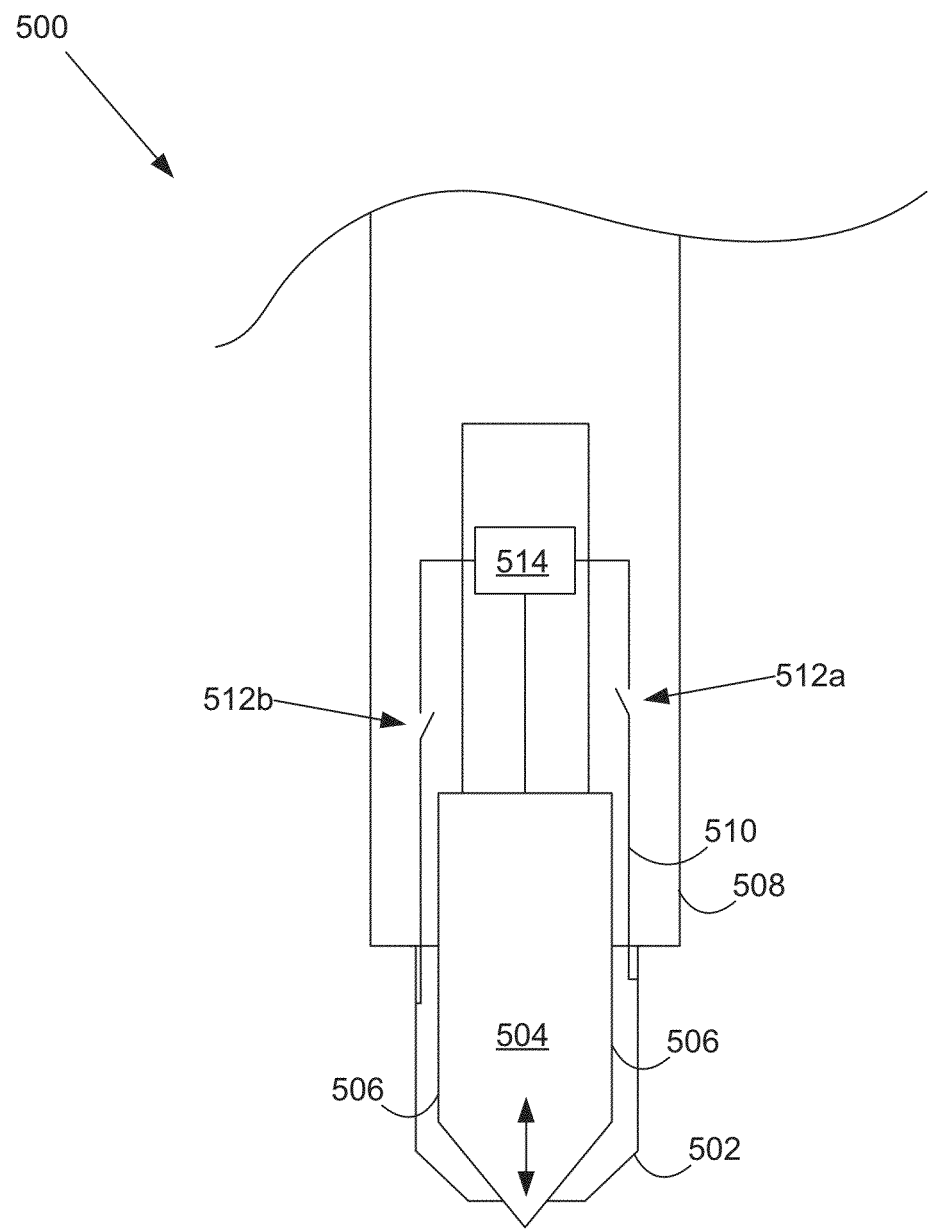
FIG. 5 is a schematic block diagram illustrating a cross-sectional view of a stylus having a dynamically switched tip shield.

FIG. 5 is a schematic block diagram illustrating a cross-sectional view of a stylus 500 having a dynamically switched tip shield 502. In an embodiment, the tip shield 502 is a metal shield around the stylus tip 504 that can reduce the shadow effect on a sensor array, and thereby improve position accuracy. The tip shield 502 inhibits the electric field generated at the sides 506 of the stylus tip 504 and decreases stylus tip to ITO sense current.

The tip shield 502 extends from and is coupled with a stylus housing 508. The tip shield 502, in one mode, has the same potential as the stylus housing 508. In other words, the tip shield 502, in one mode, is grounded with the stylus housing. In another embodiment, the tip shield 502 can be connected to any low impedance constant node, for example, power supply nets, voltage source, etc. Grounding or isolating the tip shield 502 from the stylus tip 504 shields the electric field generated by the TX driver, as described above, and subsequently reduces the shadow effect of an unshielded stylus tip 504.

In another mode the tip shield 502 is electrically coupled to the stylus tip 504 to improve hover mode, as described above with reference to FIG. 1. The tip shield 502, in one embodiment, may be coupled to the stylus tip 504 by way of a conductive path 510. A switch 512 is disposed between the tip shield 502 and the stylus tip 504. A stylus controller 514 is configured to control the switch 512 in either a first mode (e.g., closed) or a second mode (e.g., open). One example of a stylus controller 514 suitable for use in the embodiment of FIG. 5 is described above with reference to PSoC 224 of FIG. 2. Alternatively, the controller 514 comprises a switching circuit configured to transmit the TX potential over multiple outputs, or in other words, the controller 514 is configured to selectively transmit the TX potential to the tip shield 502 and/or the conductive stylus tip 504.

In the first mode, the switch 512 is closed thereby completing the path 510 to the tip shield 502 and electrically coupling the tip shield 502 with the stylus tip 504. In the first mode, the controller 514 sends the same TX potential to both the tip shield 502 and the stylus tip 504 thereby increasing hover sensitivity and hover distance. For clarity, the controller 514 of FIG. 5 represents the components of the stylus 130 described above in FIG. 2.

In the second operating mode, the controller 514 instructs the switch 512a to open and electrically isolate the tip shield 502 from the stylus tip 504. In another embodiment, a second switch 512b may connect the tip shield 502 to device ground or any other constant voltage source. In the second operating mode, the tip shield 504 shields any electric field that may occur at the sides 506 of the stylus tip 504, and thereby reduce shadow effects. The controller 514 instructs the switch 512 to open, in one embodiment, when the stylus tip 504 comes in contact with an object such as a touchscreen. Upon contacting a touchscreen, which subsequently moves the stylus tip 504 into the stylus housing 508, the controller 514 instructs the switch 512 to enter an "open" state. The controller 514 includes, as is described above, a force sensor for detecting contact between the stylus tip 502 and an object. The force sensor will be described in greater detail below with reference to FIGS. 8-9f.

In an alternative embodiment, the tip shield 502 may not be electrically coupled with the stylus tip 504, but rather receive the same TX potential as the stylus tip 504 as determined by the controller 514. In other words, the controller 504 is configured with a TX potential output for each of the tip shield 502 and the stylus tip 504. In another embodiment, the controller 514 is configured to determine when the stylus tip 504 is proximate an object such as the sensor array. For example, the controller 514 may be configured to measure proximity based on an increase in the electrical field around the stylus tip 504, and electrically isolate or ground the tip shield 502 when the strength of the electrical field is greater than a threshold value.

Figure 6:
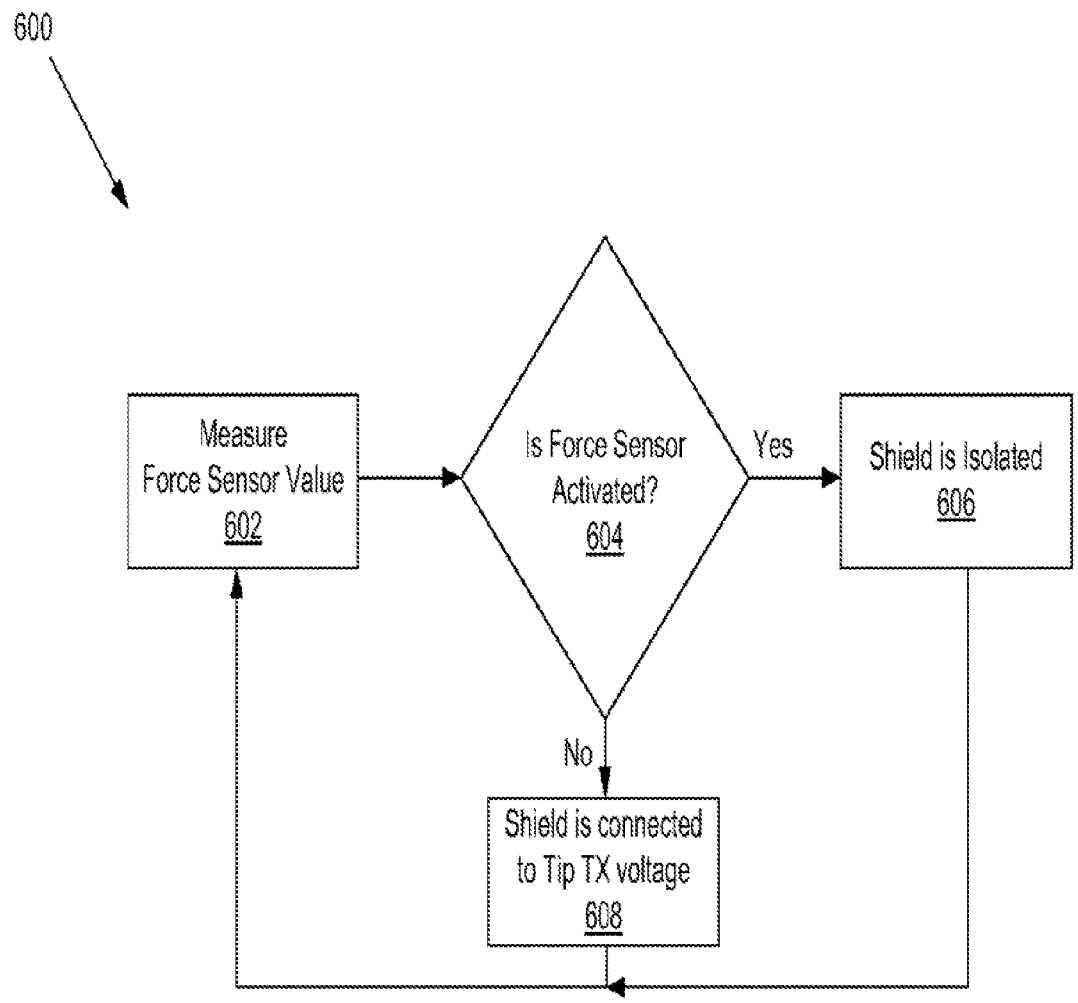
FIG. 6 is a schematic flow chart diagram illustrating one embodiment of a method for dynamic shield switching of the tip shield.

FIG. 6 is a schematic flow chart diagram illustrating one embodiment of a method for dynamic shield switching of the tip shield. The method 600 starts and the controller measures 602 the force sensor value 602. Measuring 602 the force sensor value, in one embodiment, refers to determining a force value from a sensor. Examples of suitable sensors include, but are not limited to, inductive, capacitive, resistive, force sensing resistor, piezo, and optical sensors.

If the controller determines 604 that the force sensor is activated, the controller isolates 606 the tip shield and connects the tip shield to ground or any other constant voltage source. In one embodiment, isolating 606 the tip shield comprises instructing the switch of FIG. 5 to open. Alternatively, the controller may ground or isolate the tip shield by not sending the same TX potential to the tip shield. If the force sensor is not activated 604, then the stylus is in hover mode and the controller connects 608 the tip shield to the TX potential of the stylus tip to increase hover sensitivity and hover distance.

Figure 7:
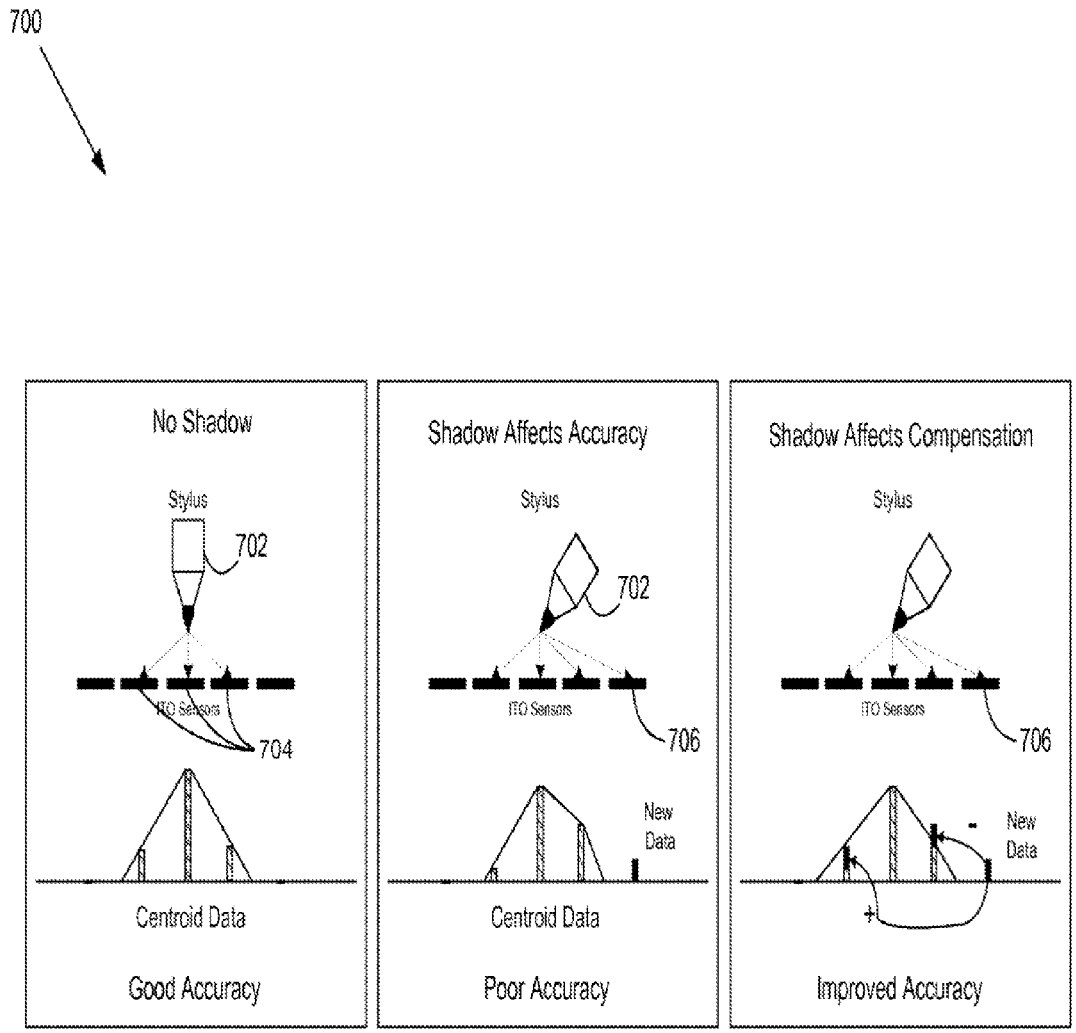
FIG. 7 is a schematic block diagram graphically illustrating shadow effect correction.

FIG. 7 is a schematic block diagram graphically illustrating shadow effect correction 700. The processing device 305 of FIG. 3 may be configured to correct shadow effect by analyzing centroid data. Centroid data refers to, in one embodiment, data that identifies the center of a touch from the stylus. When the stylus 502 is perpendicular to the ITO sensors 704, there is no shadow effect, and the ITO sensor directly under the stylus 702 indicates the center of the touch. However, when the stylus 702 is at a non-perpendicular angle to the ITO sensors 704, a fourth ITO 706 sensor will detect the stylus 702 and cause the "center" of the touch to shift towards the new data point.

The controller 305, in one embodiment, is configured to correct for the center shift by subtracting the new data 706 from the neighbor electrode, or ITO sensor, and adding the value to the far electrode as depicted. In an embodiment, when the stylus 702 is perpendicular three electrodes will be active. If a fourth electrode is active, this indicates to the controller 305 that the stylus is not perpendicular to the surface of the sensor array, and the fourth sensor information may be used to compensate for the shadow effect.

Figure 8:
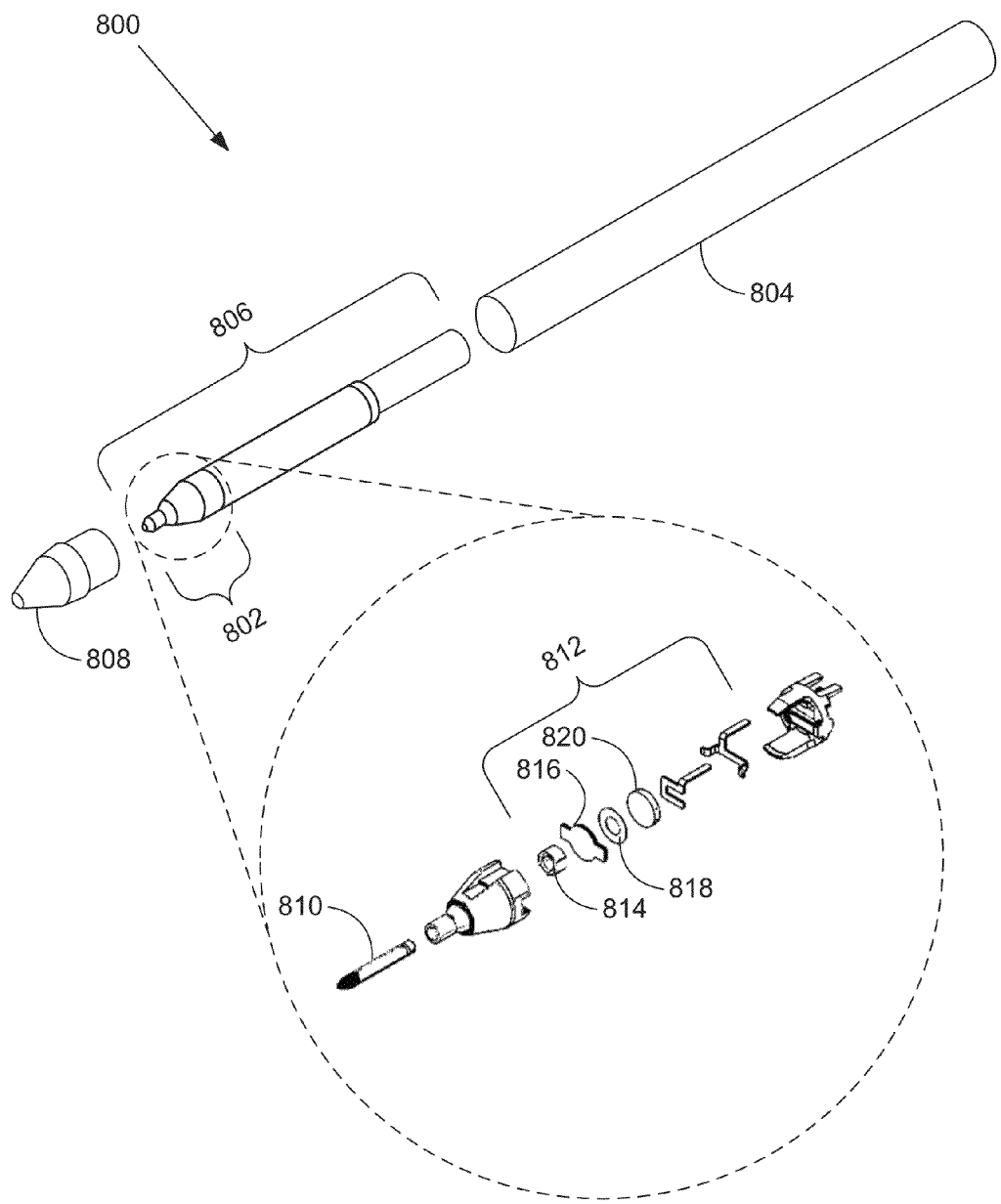
FIG. 8 is a perspective view diagram illustrating one embodiment of a stylus having a force sensor.

FIG. 8 is a perspective view diagram illustrating one embodiment of a stylus 800 having a force sensor. FIG. 8 also depicts an exploded view diagram of one example of a force sensor integrated into the tip area 802 of the stylus 800. The stylus 800 includes a stylus housing 804, a stylus assembly 806, and a tip shield 808. The stylus housing 804, in one embodiment, is an elongated tube configured to receive the stylus assembly 806 and engage or couple to the tip shield 808. The stylus assembly 806 supports the various components described above with reference to FIG. 2. In short, the stylus assembly 806 supports the stylus tip 810, force sensor 812, TX driver and PSoC (not shown here).

The force sensor 812 comprises an actuator 814, a deformable and/or compressible conductive diaphragm 816, an insulating spacer 818, and a conductive contact plate 820. The stylus tip 810, when pressing against an object, transfers the force of the contact to the actuator 814 which in turn presses on the deformable, semi-conductive diaphragm 816. The force causes the diaphragm 816 to contact the conductive contact plate 820 which is then detected by the controller or PSoC (not shown).

In one embodiment, the force sensor 812 may be an inductive force sensor. An inductive force sensor may sense or detect changes in inductance when a ferrite core moves through an inductor in the inductive force sensor. Inductance changes may be measured using an LC circuit (e.g., a resonant circuit, a tank circuit, a tuned circuit, etc.) or using various other methods or components. An inductive force sensor may allow the stylus 800 to have larger stylus tip movement range and linear sensor characteristics.

In another embodiment, the force sensor 812 may be a capacitive force sensor. The capacitive force sensor may measure the change in capacitance that results when the distance between capacitor plates in the capacitive force sensor changes. The capacitive force sensor may use ceramic dielectrics for the capacitor plates to achieve higher capacitance changes.

In a further embodiment, the force sensor 812 may be a piezo force sensor. A piezo force sensor may be a force sensor that includes a piezoelectric material. The piezoelectric material may generate a charge or a voltage when the piezoelectric material is compressed (e.g., when a force is applied to the piezoelectric material).

In yet another embodiment, the force sensor 812 may be a force sensing resistor sensor. The force sensing resistance sensor may include a conductive polymer. The resistance of the conductive polymer may change based on the pressure or force applied to the conductive polymer. The force sensing resister sensor may detect the change in the resistance of the conductive polymer. The conductive polymer may exhibit a linear resistance change due to an applied force or pressure. The conductive polymer may be tunable for difference ranges and responses by altering materials properties.

In one embodiment, the force sensor 812 may be an optical sensor. The optical sensor may include a light source (e.g., a light emitting diode (LED)), a receiver photodiode, and a semitransparent film between the light source and the photodiode. Movement of the stylus tip due to a pressure or force may change the position of the semitransparent film and more or less light may be detected by the photodiode.

Additional force sensors will be described in greater detail below with reference to FIGS. 9a through 21.

FIGS. 9a-9c illustrate exemplary embodiments of a force sensor comprising a deformable actuator. FIG. 9a depicts a plunger 902 coupled with the stylus tip 904 that is configured to slide in and out of the stylus housing 906 as a force is applied to the stylus tip 904. A deformable actuator 908 is disposed between the plunger 902 and a sensor substrate 910. The deformable actuator 908 biases the stylus tip 904 and causes the stylus tip 904 to return to a fully extended position once the force is removed from the stylus tip 904. Stated differently, the deformable actuator functions in a manner similar to a spring to return the stylus tip 904 to a default position.

FIG. 9b illustrates another embodiment of a force sensor utilizing a deformable actuator. The deformable actuator 912, in one embodiment, extends from the stylus tip 904 to the sensor substrate 910. The deformable actuator 912 may be over-molded onto a member 914 extending from the stylus tip 904.

FIG. 9c illustrates one embodiment of a deformable actuator 916 in directly in contact with both the stylus tip 904 and sensor substrate 910. In this example, the stylus tip 904 moves up and down in the stylus housing and presses directly onto the deformable actuator when subject to vertical pressure.

FIG. 9d is an illustration of the operation of a deformable partially conductive actuator 918. As a force is applied to the stylus tip, and subsequently transferred to the deformable actuator 918, the deformable actuator 918 deforms and the conductive surface of the deformable actuator 918 increasingly contacts a greater portion of a sensor 920. The sensor 920, in one example, includes a resistive trace across an actuator engaging surface of the sensor 920. As such, as the surface of the deformable actuator 918 that contacts the sensor 920 increases, the resistance of the resistive trace decreases. In other words, the deformable actuator 918 increasingly shorts out more and more of the resistive trace as pressure is increased. Alternatively, the traces on the surface of the sensor 920 may form an open circuit that is only completed with a sufficient force on the deformable actuator 918. In another example, a ridge or other physical feature or mechanical obstruction may be placed in the interior of the stylus housing such that the deformable actuator is maintained slightly out of contact with the sensor 920 until a threshold amount of pressure exerted on the stylus tip overcomes the mechanical obstruction.

FIGS. 9e and 9f illustrate alternative substrate sensors for use with the deformable actuator. Referring first to FIG. 9e, a non-conductive deformable actuator 922 may be used with an optical sensor 924. The deformation of the actuator 922 is sensed optically. Light is directed into the stylus housing between the deformable actuator 922 and the sensor 924 from an aperture in the substrate using a light source 926 such as an LED. The sensor 924 is, in one embodiment, a photodiode configured to sense light from the light source. As the actuator 922 deforms the aperture above the sensor 924 progressively closes, reducing the light incident on the sensor 924. In a further embodiment, a transparent disk may be placed above the substrate to prevent the actuator 922 from being pressed into the apertures in the substrate.

Examples of sensors 924 include, but are not limited to, photodiodes, phototransistors and light-sensitive resistors. The output of the sensor 924 may be an analog signal which may vary in response to the force exerted on the deformable actuator 922. Alternatively, a photo detector array such as a linear photodiode array may be used to improve accuracy.

FIG. 9f illustrates a capacitive sensor 928. A capacitor is formed between the surface of a carbon-imprinted actuator 930 and a circular PCB trace formed on an upper surface of the substrate 932, with the solder resist 934 (or other coating or insulating layer) providing the dielectric. A hole in the PCB trace and solder resist 934 allows an electrical contact to be made from the lower side of the substrate 932 to the actuator 930.

As force is applied to the actuator 930, the actuator 930 deforms as previously described, causing the area of the upper plate of the capacitor to increase, and thereby increase the total capacitance between the actuator 930 and the circular plate on the substrate 932. This capacitance may then be measured using one of the techniques previously described or other methods known to those skilled in the art.

Figure 10:
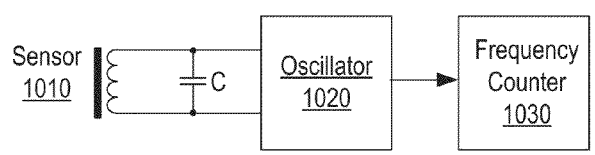
FIG. 10 is a block diagram illustrating an inductive sensor according to one embodiment.

FIG. 10 is a block diagram illustrating an inductive sensor 1000 according to one embodiment. The inductive sensor 100 includes a sensor 1010, an oscillator 1020, and a frequency counter 1030. A force or a pressure on the sensor 1010 may cause a change in the inductance of the sensor 1010. The change in the inductance of the sensor 1010 causes the frequency of the oscillator 1020 to change. The frequency counter 1030 may measure the frequency of the oscillator 1030 to determine the amount of force of pressure applied to the sensor 1010.

Figure 11:
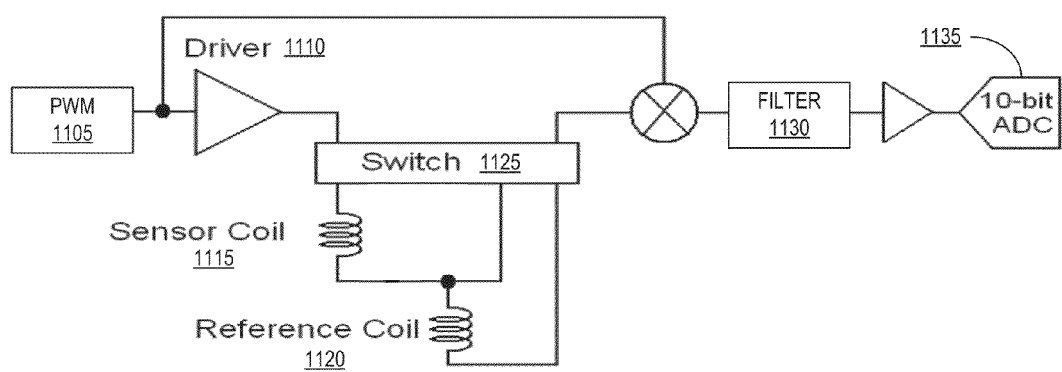
FIG. 11 is a block diagram illustrating an inductive sensor according to another embodiment.

FIG. 11 is a block diagram illustrating an inductive sensor 1100 according to another embodiment. The inductive sensor 1100 includes a PWM 1105, a driver 110, a sensor coil 1115, a reference coil 1120, a switch 1125, a filter 1130, and an ADC 1135. The PWM 1105 generates a current or a voltage that is provided to the driver 110 and to switch 1125. The current or voltage is provided to one or more of the sensor coils 1115 and 1120 by the switch 1125. The filter receives the current from the switch 1125 and the driver and provides the current to the 10-bit ADC 1135 which determines the amount of pressure or force based on the current or voltage.

Figure 12:
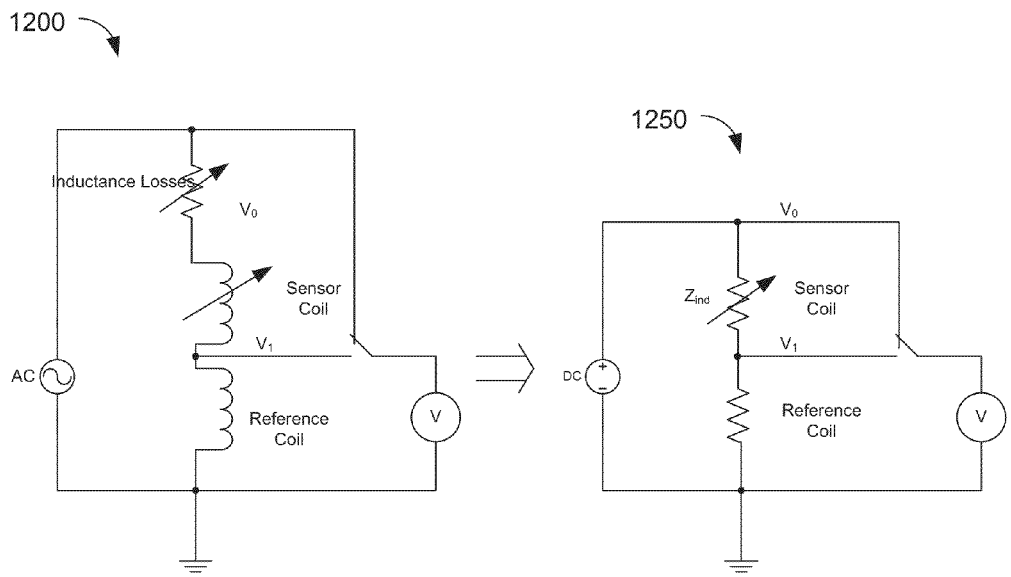
FIG. 12 is a block diagram illustrating inductive according to one embodiment.

FIG. 12 is a block diagram illustrating inductive sensors 1200 and 1250 according to one embodiment. The inductive force sensors 1200 and 1250 use the electromagnetic interaction between a conductive target and a sensing coil to detect the pressure applied by the user on the surface of a touch panel. The pressure created by the user causes a minute flex in the target, changing the spacing between the coil and target, which may result in a change in the impedance of the sensing coil. An impedance measurement circuit may be multiplexed between the various sensor coils to detect the impedance changes indicating a user's press on a specific coil.

In one embodiment, to measure the impedance of a sensor coil, the coil may be excited with a pulsed current. This may produce a pulsed voltage across the coil that is proportional to both the current and the impedance of the coil. The impedance system may convert the pulsed voltage into a DC voltage proportional to the amplitude of the pulsed voltage. The resulting DC value may be converted to a binary number using an ADC, and processing logic (e.g., hardware, software, or a combination of both) may determine whether the shift in impedance is indicative of a user's force. In one embodiment, to assist in maintaining consistency in the readings, a reference coil may be used to remove variations in the readings due to long term variations in the current and due to temperature shifts. The reference coil may be coupled in series with the sensor coil, and may be measured as part of the conversion process. The resulting value for the reference coil is divided into the sensor coil, resulting in a "normalized value" for the coil. By using the impedance ratio of the two coils, variations in the impedances due to temperature or long term drive current variation may be canceled out and the result value may be a temperature and voltage compensated value.

Figure 13:
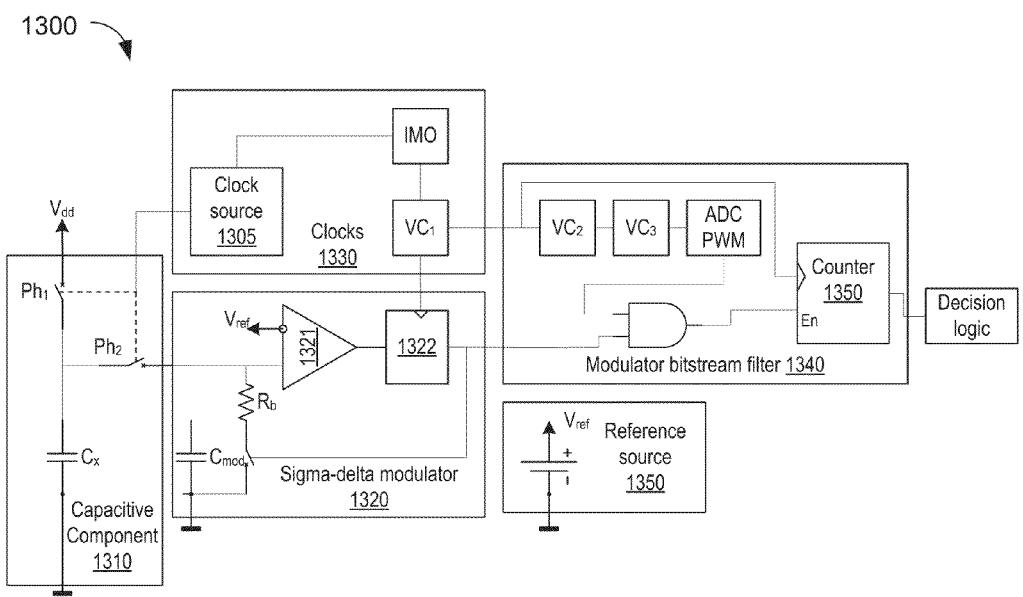
FIG. 13 is a block diagram illustrating a capacitive force sensor according to one embodiment.

FIG. 13 is a block diagram illustrating a capacitive force sensor 1300 according to one embodiment. The capacitive force sensor 1300 includes a capacitive component 1310, a sigma-delta modulator 1320, a modulator bitstream filter 1340, and a reference source 1350. The modular bitstream filter 1340 includes a comparator 1321, a comparator latch 1322, a modulation capacitor $C_{mod}$, and a discharge resistor $R_b$. When the modulation capacitor voltage $VC_{mod}$ reaches the comparator reference voltage $V_{ref}$, the comparator 1321 nay toggle or turn on the capacitor discharge resistor $R_b$ via a switch. The capacitor $C_{mod}$ voltage may drop. When the modulator capacitor $C_{mod}$ voltage falls below the reference voltage, the discharge resistor $R_b$ may be disconnected. The modulator capacitor $C_{mod}$ voltage starts rising again, repeating the modulation capacitor $C_{mod}$ charge/discharge cycles. The latch 1322 may synchronize the operation of the comparator 1321 to the clock VC1 signal and may limit the discharge switch on/off time. The modulator 1320 may keep the modulator capacitor voltage $VC_{mod}$ close to the reference voltage $V_{ref}$ in average by alternatively turning on/off the discharge switch.

The modulator 1320 may convert the capacitance to the output bit stream duty cycle. The duty cycle is measured using a modular bitstream filter 1340. The modular bitstream filter 1340 includes 8-bit hardware counter 1350 and a measurement interval forming circuit. The counter 1350 may be extended to 16 bits by handling the terminal count overflows in firmware to save hardware resources. The counter 1350 uses the common VC1 clock signal that is also used by the modulator 1320. The counter 1350 preserves its state when the modulator 1320 output is low and decrements by one when modulator 1320 output is high.

Figure 14:
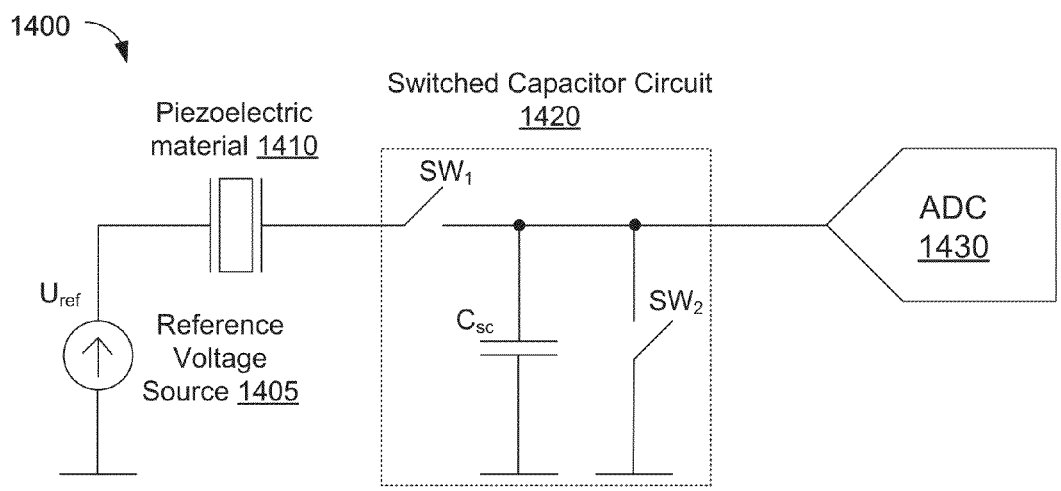
FIG. 14 is a block diagram illustrating a piezo force sensor according to one embodiment.

FIG. 14 is a block diagram illustrating a piezo force sensor 1400 according to one embodiment. The piezo force sensor 1400 includes a piezoelectric material 1410, a switched capacitor circuit 1420, and an ADC 1430. The piezo force sensor 1400 may measure an amount of force using the ADC 1430 with switched capacitor circuit 1420 based on a charge balancing principle. The piezoelectric material 1410 is connected to reference voltage source 1405 on one side and switched capacitor circuit 1420 on the other. The reference voltage source 1405 allows the piezo force sensor 1400 to generate negative voltage after a finger is release. Both positive and negative signals parts may be correctly measured. The reference voltage source 1405 may be a resistive divider or two microcontroller pins configured to pull-up and pull-down modes and split together. The amount of force may be measured when the switched capacitor circuit 1420 charges capacitor $C_{SC}$ to a reference voltage. Switches $SW_1$ and $SW_2$ are opened and capacitor $C_{SC}$ holds the voltage generated by the piezoelectric material 1410. The ADC 1430 processes the output of the switched capacitor circuit 1420 to determine the amount of force or pressure.

Figure 15:
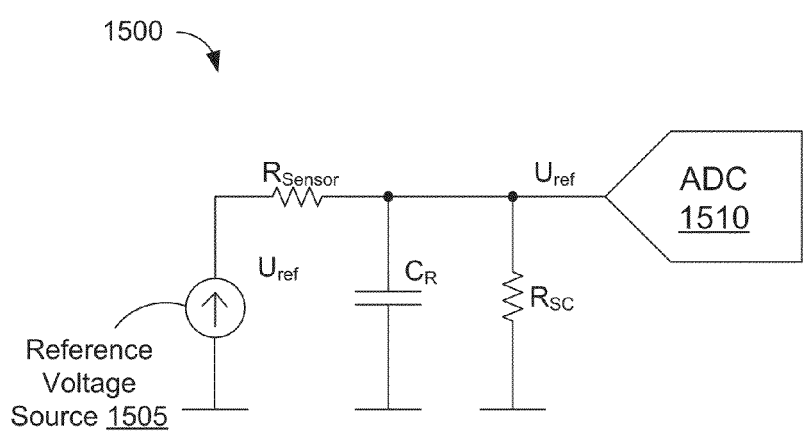
FIG. 15 is diagram illustrating a force sensor according to one embodiment.

FIG. 15 is diagram illustrating a force sensor 1500 according to one embodiment. The force sensor 1500 is includes to a reference voltage source 1505, a resistor $R_{sensor}$, a capacitor $C_R$, a resister $R_{SC}$, and an ADC 1510. The force sensor 1500 may measure the amount of force or pressure that is applied to the tip of a stylus. In one embodiment, the capacitor $C_R$ may be a switched capacitor circuit.

In one embodiment, the force sensors illustrated in FIGS. 14 and 15 may not use high value resistors. The force sensors illustrated in FIGS. 14 and 15 may use switched capacitor circuits and may provide the same functionality as high value resistors. The switched capacitor circuit may be less expensive and easier to integrate in a chip or microcontroller. The switched capacitor circuit may not have a continuous discharge current when compared to a resistor that provides a long press time limited by the sensor's internal leakage current. The switched capacitor circuit decreases the influence of the ADC leakage current on the force sensor because the ADC input may be disconnected from the force sensor while data is being processed. The force sensor may set the ADC input voltage to a reference value if no force is applied. This may increase the sensitivity of the force sensor and does not use a charge to connect traces. The switched capacitor circuit may also compensate for temperature drift. Temperature changes and gradients may cause some force sensor parameters to change. However, switched capacitor circuits may provide a stable reference voltage on the ADC input without depending on other sensor parameters. A switched capacitor circuit may also compensate for the force sensor's parasitic capacitance. These capacitances may be charged to a reference voltage.

In one embodiment, a switched capacitor circuit may be used on general purpose microcontrollers without external components. A force sensor that uses a switched circuit capacitor may use an ADC (that may be 10-bits or more), a sensor multiplexer and the switched capacitor circuit. The switched capacitor circuit may also be constructed using the multiplexer and a GPIO. A switched capacitor circuit may also have little or no RF radiation. Unlike a charge balancing principle, the switched capacitor circuit may not have short pulses on the force sensor that cause radiation. In another embodiment, the resistor $R_{SC}$ may operate as continuous resistor or a discrete resistor, based on the switched capacitor circuit (e.g., based on capacitor $C_R$).

Figure 16:
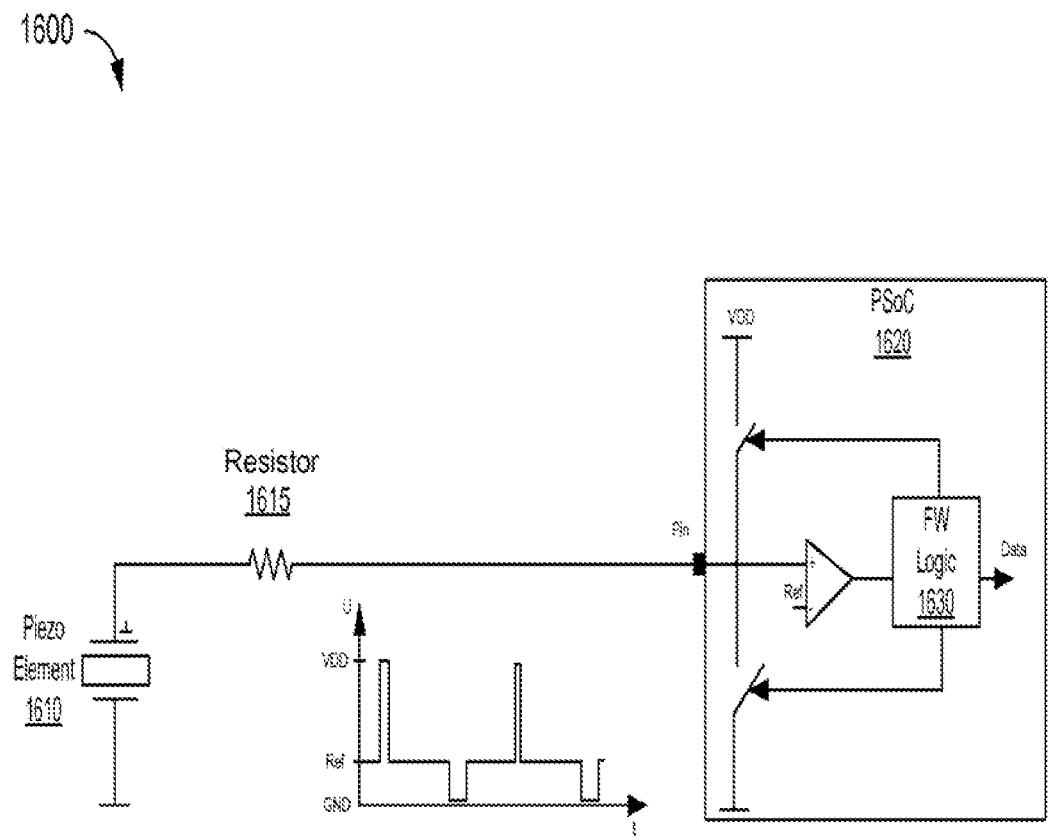
FIG. 16 is a block diagram illustrating a piezo force sensor according to one embodiment.

FIG. 16 is a block diagram illustrating a piezo force sensor 1600 according to one embodiment. The piezo force sensor 1600 includes a piezo element 1610, a resistor 1615, and a PSoC 1620. The input of the PSoC 1620 is tested and if the input voltage signal is higher than the Ref voltage, the output is pulled such that VDD=0V for a short period of time. Combined with the serial resistor 1615, this corresponds to an extraction of the electrical charge out of the piezo element 1610. If the input voltage signal is lower than the voltage Ref, the output is pulled over the serial resistor to VDD=5V for a short time. This corresponds to feeding or providing electrical charge into the piezo element 1610. The voltage at the input to the PSoC 1620 and at the attached piezo element may be controlled constantly to the voltage threshold of the microprocessor. This method may balance the piezo force sensor charge using a Sigma-Delta modulator as described above.

Figure 17:
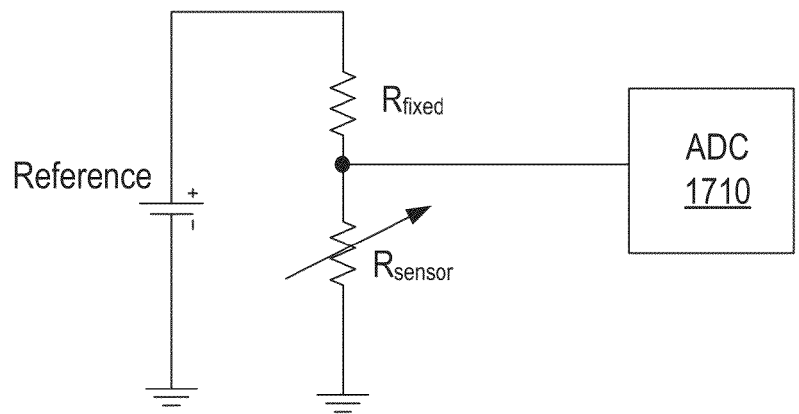
FIG. 17 is a block diagram illustrating a force sensing resistor sensor according to one embodiment.

FIG. 17 is a block diagram illustrating a force sensing resistor sensor 1700 according to one embodiment. The force sensing resistor sensor 1700 includes a resister $R_{fixed}$ and a resister $R_{sensor}$ coupled to an ADC 1710. The force sensing resistor sensor 1700 may be measured by using an ADC or a Sigma-Delta Modulator. The two resistors $R_{fixed}$ and a resistor $R_{sensor}$ create a voltage divider. The output voltage may be based on the resistance of the force sensing resistor sensor 1700. The ADC measures this voltage and may determine the amount of force or pressure of a contact.

Figure 18:
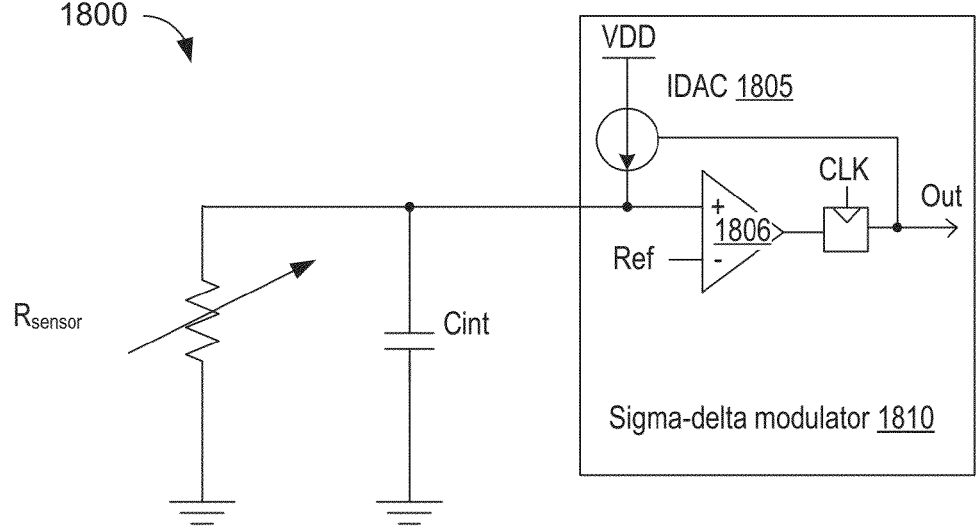
FIG. 18 is a block diagram illustrating a resistive force sensor according to one embodiment.

FIG. 18 is a block diagram illustrating a resistive force sensor 1800 according to one embodiment. The resistive force sensor includes a resistor $R_{sensor}$, a capacitor $C_{int}$, and a sigma-delta demodulator 1810. The current digital to analog converter (IDAC) 1805 supplies a current to the resistive force sensor 1800. The voltage of the capacitor $C_{int}$ starts rising. The comparator 1806 turns off the IDAC 1805 if the input voltage is above the reference Ref. The comparator bitstream (e.g., the sequence of on and off) pulse width may indicate the resistance of the resistive force sensor 1800. This bit stream may be measured using digital filter or using other known methods or functions.

Figure 19:
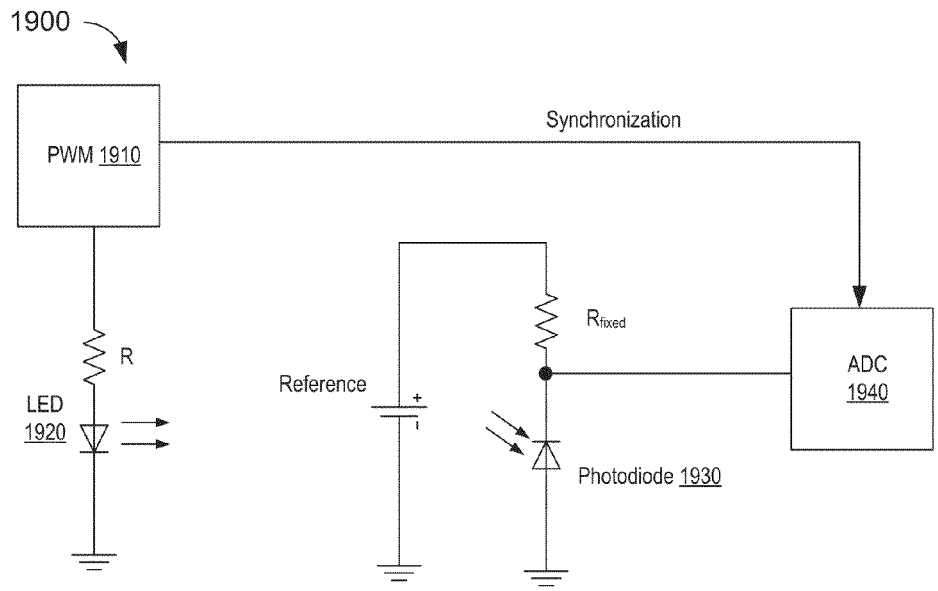
FIG. 19 is a block diagram illustrating an optical force sensor according to one embodiment.

FIG. 19 is a block diagram illustrating an optical force sensor 1900 according to one embodiment. The optical force sensor 1900 includes a PWM 1910, an LED 1920 (e.g., a light source), a photodiode 1930, and an ADC 1940. The PWM 1910 generates a short pulse that feeds to LED 1920. The optical force sensor 1900 may also include a semi-transparent membrane between the LED 1920 and the photodiode 1930 that may move when force is applied to the optical force sensor 1900. This may change the amount of light received by the photodiode 1930. The light is received by photodiode 1930 which generates a voltage based on the amount of light received. The ADC measures the voltage generated by the photodiode 1930 to measure the amount of force or pressure.

Figure 20:
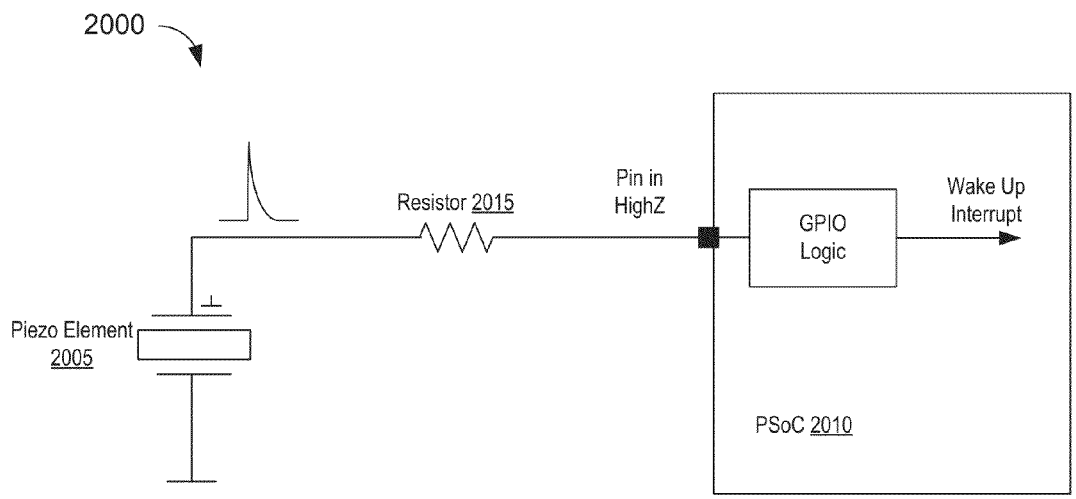
FIG. 20 is a block diagram illustrating a piezo force sensor according to one embodiment.

FIG. 20 is a block diagram illustrating a piezo force sensor 2000 according to one embodiment. The force sensor 2000 includes a piezo element 2005, a resistor 2015, and a PSoC 2010. The piezo force sensor 2000 may be used for stylus power management. For example, the piezo force sensor 2000 may operate as an on/off switch. Initially, a stylus may be in sleep mode (e.g., may be off). The piezo element 2005 is connected to a GPIO pin that is configured as a wake up interrupt input. When the tip of a stylus is pressed, the press (e.g., the force or pressure) changes the pin voltage (e.g., by causing the piezo element 2005 to generate a voltage) and causes the wake up interrupt. This allows the stylus to turn on and off without using a mechanical on/off switch.

Figure 21:
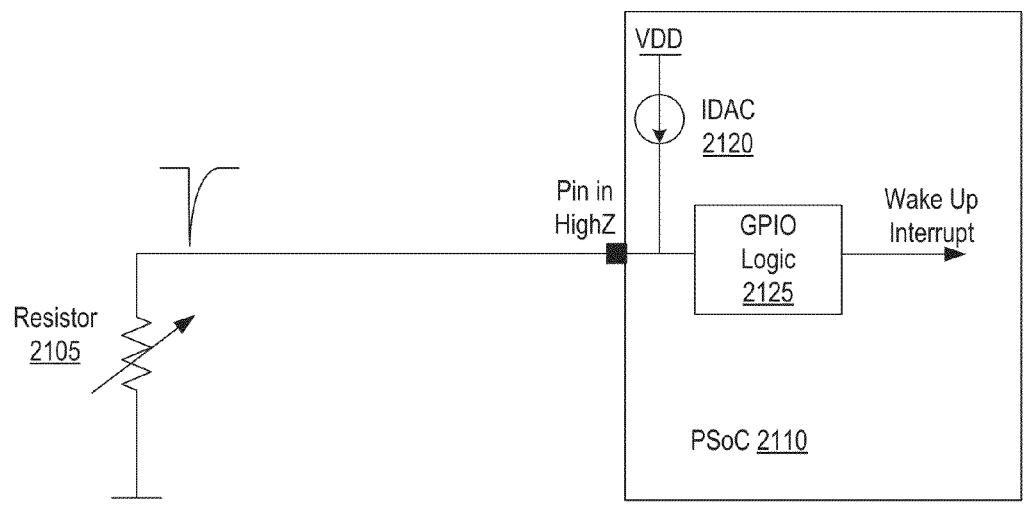
FIG. 21 is a block diagram illustrating a resistive force sensor according to one embodiment.

FIG. 21 is a block diagram illustrating a resistive force sensor 2100 according to one embodiment. The resistive force sensor 2100 includes a resistor 2105 and a PSoC 2110. The resistive force sensor 2100 may be used for stylus power management. For example, the resistive force sensor 2100 may operate as an on/off switch. In one embodiment, the force sensor value of the resistive force sensor 2100 in a released state (e.g., when no force or pressure is applied the resistive force sensor 2100) may be 1 MOhm to 10 MHom. The force sensor value of the resistive force sensor 2100 in a pressed state (e.g., when a force a pressure is applied to the resistive force sensor 2100) may be in kOhm range. The variation in the resistance may be used to turn the stylus on and off.

The IDAC 2120 supplies a current for the resistive force sensor 2100. This current value is high enough to get the pin input to the PSoC 2110 to a high state. For example, the current value may be 1 uA or less. If no IDAC is available, an external pull up resistor may be used. When the tip of the stylus is pressed, the resistance of the resistive force sensor 2100 changes and the voltage goes to zero. The GPIO logic 2125 generates an interrupt and wakes up or turns on the stylus. In one embodiment, this method may also be implemented also if the tip of the stylus is depressed for a period of time. For example, the stylus can wake up if both positive and negative edges are detected.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus comprising:
   a stylus housing having an end;
   a transmit (TX) drive circuit disposed at least partially inside the stylus housing;
   a tip shield configured to be coupled to the TX drive circuit to receive a TX potential from the TX drive circuit;
   a conductive tip disposed at least partially inside the stylus housing and extending from the end, the conductive tip configured to receive the TX potential from the TX drive circuit and capacitively couple a transmit signal to a sense array when the tip shield is coupled to the TX drive circuit, when the tip shield is not coupled to the TX drive circuit, and without a change in contact between the conductive tip and a touch surface;
   a force sensor coupled to the conductive tip and configured to measure a force of a contact between the conductive tip and the touch surface; and
   a switch configured to electrically couple the tip shield to the conductive tip when the measured force of contact indicates that the conductive tip is not in contact with the touch surface.

2. The apparatus of claim 1, wherein the force sensor comprises an inductive sensor and wherein the inductive sensor is configured to measure the force of the contact by measuring a change of an impedance of a sensing coil in the inductive sensor.

3. The apparatus of claim 1, wherein the force sensor comprises a capacitive sensor and wherein the capacitance sensor is configured to measure the force of the contact by measuring a change in a capacitance of a capacitor in the capacitive sensor.

4. The apparatus of claim 1, wherein the force sensor comprises a piezo sensor and wherein the piezo sensor is configured to measure the force of the contact by measuring a voltage generated by a piezoelectric material in the piezo sensor.

5. The apparatus of claim 1, wherein the force sensor comprises a force sensing resistor sensor and wherein the force sensing resistor sensor is configured to measure the force of the contact by measuring a change in resistance of a resistor in the force sensing resistor sensor.

6. The apparatus of claim 1, wherein the force sensor comprises an optical sensor, and wherein the optical sensor is configured to measure the force of the contact by measuring an amount of light from a light source in the optical sensor.

7. The apparatus of claim 1, wherein the tip shield is coupled with the stylus housing and extends from the end and further comprising a switch coupled to the tip shield and the conductive tip, wherein the switch is configured to electrically couple the tip shield to the conductive tip in a first mode and to electrically isolate the tip shield from the conductive tip in a second mode.

8. The apparatus of claim 7, further comprising:
a processing device configured to:
  instruct the switch to electrically couple the tip shield to the conductive tip when the force sensor detects that the conductive tip is not in contact with the touch surface; and instruct the switch to electrically isolate the tip shield from the conductive tip when the force sensor detects that the conductive tip is in contact with the touch surface.

9. The apparatus of claim 8, comprising the transmit (TX) drive circuit coupled to the processing device, wherein the TX drive circuit is configured to transmit the TX potential in the first mode to the tip shield and to the conductive tip when the force sensor detects that the conductive tip is not in contact with the touch surface and wherein the TX drive circuit is configured to transmit the TX potential in the second mode to the conductive tip when the force sensor detects that the conductive tip is in contact with the touch surface.

10. A method comprising:
detecting contact between a conductive tip of a stylus and an object;
determining a force of the contact between the conductive tip of the stylus and the object;
providing, by a transmit (TX) circuit of the stylus, a TX potential to a tip shield of the stylus and the conductive tip;
capacitively coupling a transmit signal, which is responsive to the TX potential, from the tip shield and the conductive tip to a sense array; and
instructing a switch to electrically couple the tip shield to the conductive tip when a force sensor detects that the conductive tip is not in contact with the object.

11. The method of claim 10, further comprising instructing the switch to electrically isolate the tip shield from the conductive tip when the force sensor detects that the conductive tip is in contact with the object.

12. The method of claim 10, wherein the force sensor is selected from the group consisting of an inductive sensor, a capacitive sensor, a piezo sensor, a force sensing resistor sensor, and an optical sensor.

13. A system comprising:
a stylus housing having an end;
a conductive tip disposed at least partially inside the stylus housing and extending from the end;
a tip shield;
a force sensor coupled to the conductive tip and configured to measure a force of a contact between the conductive tip and a touchscreen;
a processing device within the stylus housing, the processing device configured to provide a transmit (TX) potential to the conductive tip and to the tip shield through the conductive tip, the processing device configured to electrically couple the tip shield to the conductive tip when the measured force of contact indicates that the conductive tip is not in contact with the touchscreen, wherein the TX potential is to be capacitively coupled to a sense array of the touchscreen.

14. The system of claim 13, wherein the force sensor comprises an inductive sensor and wherein the inductive sensor is configured to measure the force of the contact by measuring a change of an impedance of a sensing coil in the inductive sensor.

15. The system of claim 13, wherein the force sensor comprises a capacitive sensor and wherein the capacitance sensor is configured to measure the force of the contact by measuring a change in a capacitance of a capacitor in the capacitive sensor.

16. The system of claim 13, wherein the force sensor comprises a piezo sensor and wherein the piezo sensor is configured to measure the force of the contact by measuring a voltage generated by a piezoelectric material in the piezo sensor.

17. The system of claim 13, wherein the force sensor comprises a force sensing resistor sensor and wherein the force sensing resistor sensor is configured to measure the force of the contact by measuring a change in resistance of a resistor in the force sensing resistor sensor.

18. The system of claim 13, wherein the force sensor comprises an optical sensor, and wherein the optical sensor is configured to measure the force of the contact by measuring an amount of light from a light source in the optical sensor.

19. The system of claim 13, wherein the processing device is further configured to transmit the TX potential in a first mode to the tip shield and to the conductive tip when the force sensor detects that the conductive tip is not in contact with the object and wherein the processing device is further configured to transmit the TX potential in a second mode to the conductive tip when the force sensor detects that the conductive tip is in contact with the object.

* * * * *